United States Patent
Park et al.

(10) Patent No.: US 10,334,263 B2
(45) Date of Patent: Jun. 25, 2019

(54) INTERLAYER VIDEO ENCODING METHOD AND APPARATUS AND INTERLAYER VIDEO DECODING METHOD AND APPARATUS FOR COMPENSATING LUMINANCE DIFFERENCE

(71) Applicant: SAMSUNG ELECTRONICS CO., LTD., Suwon-si (KR)

(72) Inventors: Min-woo Park, Hwaseong-si (KR); Jae-won Yoon, Seoul (KR); Jin-young Lee, Hwaseong-si (KR); Byeong-doo Choi, Suwon-si (KR); Ho-cheon Wey, Seongnam-si (KR); Yong-jin Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 177 days.

(21) Appl. No.: 14/782,536

(22) PCT Filed: Apr. 7, 2014

(86) PCT No.: PCT/KR2014/002996
§ 371 (c)(1),
(2) Date: Oct. 5, 2015

(87) PCT Pub. No.: WO2014/163453
PCT Pub. Date: Oct. 9, 2014

(65) Prior Publication Data
US 2016/0029033 A1 Jan. 28, 2016

Related U.S. Application Data

(60) Provisional application No. 61/808,796, filed on Apr. 5, 2013.

(51) Int. Cl.
*H04N 19/44* (2014.01)
*H04N 19/176* (2014.01)
(Continued)

(52) U.S. Cl.
CPC ........... *H04N 19/44* (2014.11); *H04N 19/176* (2014.11); *H04N 19/30* (2014.11); *H04N 19/50* (2014.11); *H04N 19/597* (2014.11)

(58) Field of Classification Search
CPC .... H04N 19/176; H04N 19/70; H04N 19/105; H04N 19/46; H04N 19/61; H04N 19/597;
(Continued)

(56) References Cited

U.S. PATENT DOCUMENTS 8,295,634 B2   10/2012  Lee et al.
8,902,976 B2 *  12/2014  He ..................... H04N 19/597
                                         375/240.03

(Continued)

FOREIGN PATENT DOCUMENTS

CN         102823252 A    12/2012
KR    10-2012-0091413 A    8/2012
(Continued)

OTHER PUBLICATIONS

Communication dated Jul. 25, 2016, issued by the European Patent Office in counterpart European Application No. 14779861.5.
(Continued)

*Primary Examiner* — Dave Czekaj
*Assistant Examiner* — Kehinde Abimbola
(74) *Attorney, Agent, or Firm* — Sughrue Mion, PLLC

(57) ABSTRACT

An interlayer video decoding method comprises reconstructing a first layer image based on encoding information acquired from a first layer bitstream; reconstructing a second layer current block determined as a predetermined partition mode and a prediction mode by using interlayer prediction information acquired from a second layer bitstream and a first layer reference block corresponding to a current block of a first layer reconstruction image that is to be reconstructed in a second layer; determining whether to perform (Continued)

luminance compensation on the second layer current block in a partition mode in which the second layer current block is not split; and compensating for luminance of the second layer current block according to whether luminance compensation is performed and reconstructing a second layer image including the second layer current block of which luminance is compensated for.

4 Claims, 22 Drawing Sheets

(51) Int. Cl.
*H04N 19/30* (2014.01)
*H04N 19/50* (2014.01)
*H04N 19/597* (2014.01)

(58) Field of Classification Search
CPC .... H04N 19/119; H04N 19/159; H04N 19/82; H04N 19/91; H04N 19/44; H04N 19/593; H04N 19/124; H04N 19/187; H04N 19/30; H04N 19/33; H04N 19/136; H04N 19/59; H04N 19/50
See application file for complete search history.

(56) References Cited

U.S. PATENT DOCUMENTS

| | | | |
|---|---|---|---|
| 9,270,871 B2 * | 2/2016 | Pahalawatta | H04N 5/21 |
| 9,521,413 B2 * | 12/2016 | Pahalawatta | H04N 5/21 |
| 9,615,090 B2 * | 4/2017 | Zhang | H04N 19/597 |
| 2007/0019721 A1 * | 1/2007 | Le Leannec | H04N 19/63 375/240.1 |
| 2007/0286508 A1 * | 12/2007 | Le Leannec | H04N 19/176 382/240 |
| 2008/0267289 A1 | 10/2008 | Yu et al. | |
| 2009/0310674 A1 * | 12/2009 | Le Leannec | H04N 19/33 375/240.12 |
| 2010/0316139 A1 * | 12/2010 | Le Leannec | H04N 19/159 375/240.29 |
| 2012/0230394 A1 | 9/2012 | Lu et al. | |
| 2012/0288013 A1 * | 11/2012 | Pahalawatta | H04N 19/597 375/240.25 |
| 2013/0028322 A1 | 1/2013 | Fujibayashi et al. | |
| 2013/0028332 A1 * | 1/2013 | Le Leannec | H04N 19/44 375/240.25 |
| 2013/0034152 A1 | 2/2013 | Song et al. | |
| 2013/0051452 A1 | 2/2013 | Li et al. | |
| 2013/0194505 A1 * | 8/2013 | Pahalawatta | H04N 5/21 348/607 |
| 2013/0230108 A1 * | 9/2013 | Leannec | H04N 19/70 375/240.16 |
| 2014/0078250 A1 * | 3/2014 | Zhang | H04N 13/0048 348/43 |
| 2014/0079332 A1 * | 3/2014 | Zheng | G06T 9/007 382/248 |
| 2014/0184740 A1 * | 7/2014 | Zhang | H04N 19/597 348/43 |
| 2014/0198842 A1 * | 7/2014 | He | H04N 19/597 375/240.03 |
| 2014/0247866 A1 * | 9/2014 | Lee | H04N 19/44 375/240.02 |
| 2014/0301454 A1 * | 10/2014 | Zhang | H04N 13/0048 375/240.12 |
| 2014/0321552 A1 * | 10/2014 | He | H04N 19/00909 375/240.16 |
| 2015/0131739 A1 * | 5/2015 | Lee | H04N 19/44 375/240.16 |
| 2016/0142709 A1 * | 5/2016 | Pahalawatta | H04N 5/21 375/240.29 |

FOREIGN PATENT DOCUMENTS

| | | |
|---|---|---|
| KR | 10-1244917 B1 | 3/2013 |
| WO | 2014/166354 A1 | 10/2014 |

OTHER PUBLICATIONS

Min Woo Park et al., "3D-CE5.h related: Simplification of illumination compensation", Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013 Document: JCT3V-D0114, (8 Pages Total).
Gerhard Tech et al., "3D-HEVC Test Model 2", Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012 Document: JCT3V-B1005_d0, (118 Pages Total).
Gerhard Tech et al., "3D-HEVC Test Model 3", Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013 Document: JCT3V-C1005_d0, (51 Pages Total).
International Preliminary Report on Patentability for PCT/KR2014/002996 dated Oct. 6, 2015 [PCT/IB/373].
International Search Report for PCT/KR2014/002996 dated Jul. 10, 2014 [PCT/ISA/210].
Written Opinion for PCT/KR2014/002996 dated Jul. 10, 2014 [PCT/ISA/237].
Communication dated Nov. 27, 2017 by the State Intellectual Property Office in P.R. China in counterpart Chinese Patent Application No. 201480032475.7.
Communication dated Aug. 21, 2018 issued by the State Intellectual Property Office of P.R. China in counterpart Chinese Application No. 201480032475.7.

* cited by examiner

FIG. 5

| coding_unit( x0, y0, log2CbSize , ctDepth) { | Descriptor |
|---|---|
| ... | |
| if( skip_flag[ x0 ][ y0 ] ) | |
| prediction_unit( x0, y0, log2CbSize ) | |
| if ( icEnableFlag ) | |
| ic_flag | ae(v) |
| else { | |
| ... | |
| if( PredMode[ x0 ][ y0 ] = = MODE_INTRA ) { | |
| ... | |
| } else { | |
| if( PartMode == PART_2Nx2N ) | |
| prediction_unit( x0, y0, nCbS, nCbS ) { | |
| if ( icEnableFlag | |
| ic_flag | ae(v) |
| } | |
| ... | |
| } | |

(Brackets: 56 spans the skip_flag block through ic_flag; 57 spans the } else { block through }.)

FIG. 6

```
cu_extension( x0 , y0 , log2CbSize ) {          ← 60
  if ( rpEnableFlag )
    iv_res_pred_weight_idx
  if ( icEnableFlag && iv_res_pred_weight_idx == 0 )   ⎫
    ic_flag                                             ⎬ 61
                                                       ⎭
```

FIG. 13
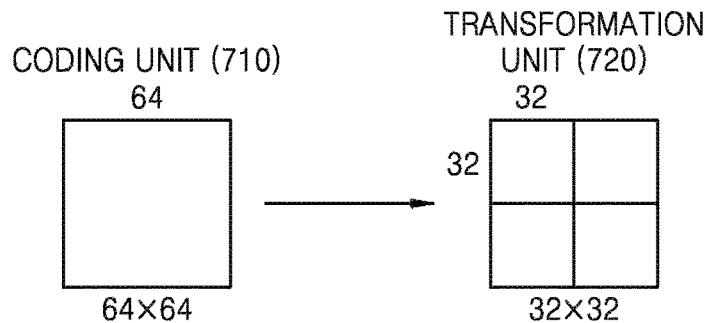
FIG. 14
PARTITION TYPE (800)
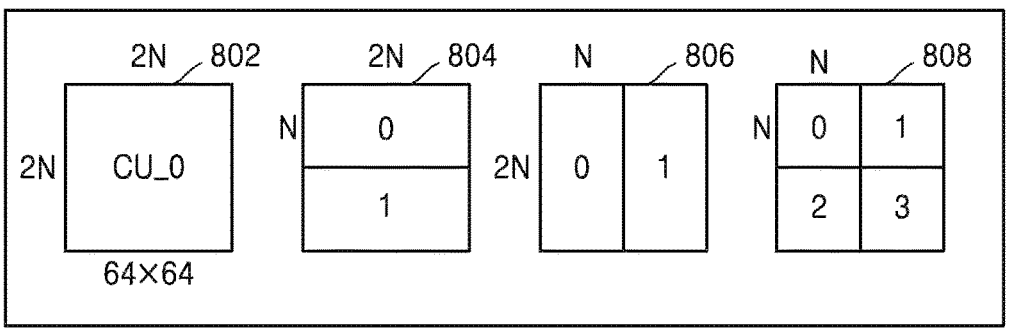
PREDICTION MODE (810)
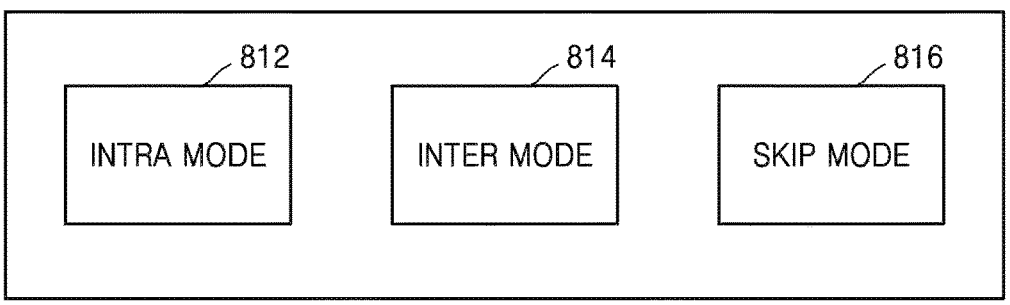
SIZE OF TRANSFORMATION UNIT (820)
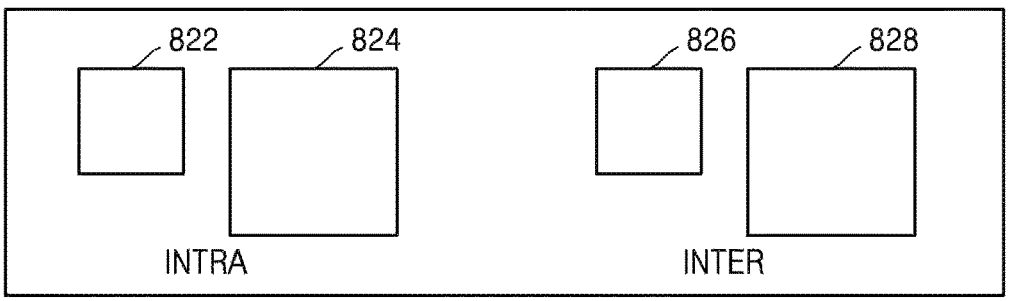

CODING UNIT (1010)

PREDICTION UNIT (1060)

INTERLAYER VIDEO ENCODING METHOD AND APPARATUS AND INTERLAYER VIDEO DECODING METHOD AND APPARATUS FOR COMPENSATING LUMINANCE DIFFERENCE

TECHNICAL FIELD

The present invention relates to interlayer video encoding and decoding methods, and more particularly, to a method of compensating for a luminance difference between interlayer images.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a coding unit having a predetermined size.

Image data of the space domain is transformed into coefficients of the frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of the space domain, coefficients of the frequency domain are easily compressed. In particular, since an image pixel value of the space domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multi-layer video codec encodes and decodes a first layer video and various second layer videos to remove temporal and spatial redundancies of the first layer video and the second layer videos and redundancy between layers, thereby reducing an amount of data of the first layer video and the second layer videos.

DETAILED DESCRIPTION OF THE INVENTION

Technical Problem

If luminance is not identical between videos for each view, since the amount of interlayer prediction errors further increases, encoding efficiency may be reduced. Accordingly, considering luminance inconsistency between views, a luminance compensation determiner 14 of an interlayer video encoding apparatus 10 may compensate for and encode a luminance difference of video for each view. For example, a luminance difference between a first view image encoded by a first layer encoder 12 and a second view image encoded by a second layer encoder 16 may be encoded. Since the luminance difference of the second view image with respect to the first view image is encoded, luminance may be compensated for when the second layer encoder 16 encodes a second view video. However, complexity may increase in order to enable compensation for the luminance.

Technical Solution

According to an embodiment of the present invention, an interlayer video decoding method comprises reconstructing a first layer image based on encoding information acquired from a first layer bitstream; reconstructing a second layer current block determined as a predetermined partition mode and a prediction mode by using interlayer prediction information acquired from a second layer bitstream and a first layer reference block corresponding to a current block of a first layer reconstruction image that is to be reconstructed in a second layer; determining whether to perform luminance compensation on the second layer current block in a partition mode in which the second layer current block is not split; and compensating for luminance of the second layer current block according to whether luminance compensation is performed and reconstructing a second layer image including the second layer current block of which luminance is compensated for.

Advantageous Effects of the Invention

According to an embodiment of the present invention, a luminance compensation application range of a multilayer image is appropriately restricted, thereby maintaining encoding efficiency and reducing complexity.

DESCRIPTION OF THE DRAWINGS

These and/or other aspects will become apparent and more readily appreciated from the following description of the embodiments, taken in conjunction with the accompanying drawings in which:

FIG. 5 illustrates an example of syntax for performing luminance compensation based on a partition mode of a current block, according to an embodiment;

FIG. 6 illustrates another example of syntax for performing luminance compensation based on a partition mode of a current block, according to an embodiment;

FIG. 13 is a diagram for describing a relationship between a coding unit and transformation units, according to an embodiment;

FIG. 14 is a diagram for describing encoding information of coding units, according to an embodiment;

BEST MODE

Figure 1A:
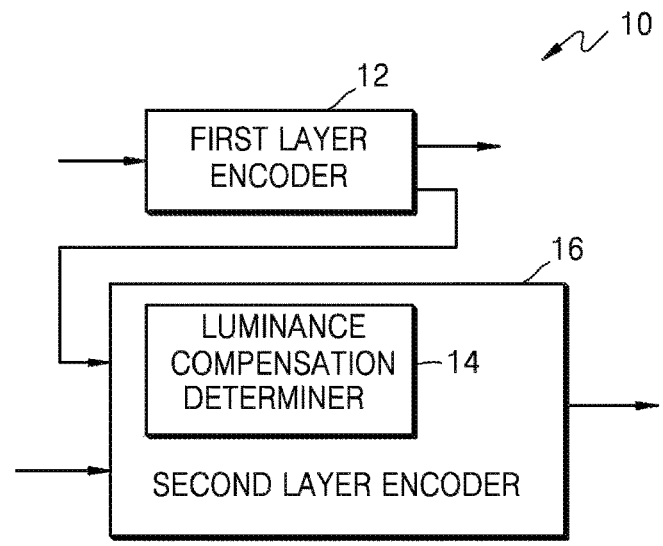
FIG. 1A is a block diagram of an interlayer video encoding apparatus, according to various embodiments.

According to an aspect of an embodiment of the present invention, an interlayer video decoding method comprises reconstructing a first layer image based on encoding information acquired from a first layer bitstream; reconstructing a second layer current block determined as a predetermined partition mode and a prediction mode by using interlayer prediction information acquired from a second layer bitstream and a first layer reference block corresponding to a current block of a first layer reconstruction image that is to be reconstructed in a second layer; determining whether to perform luminance compensation on the second layer current block in a partition mode in which the second layer current block is not split; and compensating for luminance of the second layer current block according to whether luminance compensation is performed and reconstructing a second layer image including the second layer current block of which luminance is compensated for.

When the second layer current block has a size of 2N×2N, the partition mode in which the second layer current block is not split is a 2N×2N partition mode.

The determining of whether to perform luminance compensation comprises: acquiring partition mode information and prediction mode information of a second layer block from the second layer bitstream; when the partition mode information is the partition mode in which the second layer current block is not split and the prediction mode information is not an intra prediction mode, acquiring luminance compensation information for the second layer block from the second layer bitstream; and determining whether to perform luminance compensation on the second layer current block based on the luminance compensation information for the second layer block.

The determining of whether to perform luminance compensation comprises: when the prediction mode information is not an intra prediction mode, acquiring luminance compensation information from the second layer bitstream.

The determining of whether to perform luminance compensation comprises: acquiring the luminance compensation information for a current block included in a slice determined to use luminance compensation based on the prediction mode information.

An operation of determining whether to perform luminance compensation on second layer blocks except for blocks decoded as the partition mode in which the second layer current block is not split is omitted, and luminance compensation is not performed on the second layer blocks.

The determined prediction mode is a merge mode or an advanced motion vector prediction (AMVP) mode.

According to an aspect of an embodiment of the present invention, an interlayer video encoding method comprises generating a first layer bitstream including encoding information generated by encoding a first layer image; reconstructing a second layer current block by using a first layer reference block corresponding to a second layer current block that is to be reconstructed in a first layer reconstruction image according to a predetermined partition mode and a prediction mode; determining whether to perform luminance compensation on the second layer current block in a partition mode in which the second layer current block is not split; and generating a second layer bitstream including interlayer prediction information between the second layer current block of which luminance is determined according to whether luminance compensation is performed and the first layer reference block.

When the second layer current block has a size of 2N×2N, the partition mode in which the second layer current block is not split is a 2N×2N partition mode.

The determining of whether to perform luminance compensation comprises: determining partition mode information and prediction mode information of a second layer block; when the partition mode information is the partition mode in which the second layer current block is not split and the prediction mode information is not an intra prediction mode, determining luminance compensation information indicating whether to perform luminance compensation on the second layer block; and the generating of the second layer bitstream comprises: generating the second layer bitstream including the partition mode information, the prediction mode information, and the luminance compensation information.

The determining of whether to perform luminance compensation comprises: when the prediction mode information is not an intra prediction mode, determining the luminance compensation information indicating whether to perform luminance compensation on the second layer block.

The determining of whether to perform luminance compensation comprises: determining the luminance compensation information for a current block included in a slice determined to use luminance compensation based on the prediction mode information.

An operation of determining whether to perform luminance compensation on second layer blocks except for blocks decoded as the partition mode in which the second layer current block is not split is omitted, and luminance compensation is not performed on the second layer blocks.

The determined prediction mode is a merge mode or an advanced motion vector prediction (AMVP) mode.

According to an aspect of an embodiment of the present invention, an interlayer video decoding apparatus comprises a first layer decoder for reconstructing a first layer image based on encoding information acquired from a first layer bitstream; a second layer decoder for reconstructing a second layer current block determined as a predetermined partition mode and a prediction mode by using interlayer prediction information acquired from a second layer bitstream and using a first layer reference block corresponding to a current block of a first layer reconstruction image that is to be reconstructed in a second layer; and a luminance compensation determiner for determining whether to perform luminance compensation on the second layer current block in a partition mode in which the second layer current block is not split, wherein the second layer decoder compensates for luminance of the second layer current block according to whether luminance compensation is performed and reconstructs a second layer image including the second layer current block of which luminance is compensated for.

According to an aspect of an embodiment of the present invention, an interlayer video encoding apparatus comprises a first layer encoder for generating a first layer bitstream including encoding information generated by encoding a first layer image; a second layer encoder for reconstructing a second layer current block by using a first layer reference block corresponding to a second layer current block that is to be reconstructed in a first layer reconstruction image according to a predetermined partition mode and a prediction mode; and a luminance compensation determiner for determining whether to perform luminance compensation on the second layer current block in a partition mode in which the second layer current block is not split, wherein the second layer encoder generates a second layer bitstream including interlayer prediction information between the second layer current block of which luminance is determined according to whether luminance compensation is performed and the first layer reference block.

According to another aspect of an embodiment of the present invention, there is provided a non-transitory computer-readable recording medium having recorded thereon a computer program for executing the method.

MODE OF THE INVENTION

Hereinafter, an interlayer video encoding method and an interlayer video decoding method of determining whether to perform luminance compensation based on block characteristics according to various embodiments will be described with reference to FIGS. 1A through 6. A video encoding method and a video decoding method, based on coding units having a tree structure according to various embodiments that are applicable to the interlayer video encoding method and the interlayer video decoding method will be described with reference to FIGS. 7 through 19. In addition, various embodiments to which the video encoding method and the video decoding method will be described with reference to FIGS. 20 through 26.

Hereinafter, an 'image' may denote a still image or a moving image of a video, or a video itself.

Hereinafter, a 'sample' that is data allocated to a sampling location of an image may mean data that is a processing target. For example, pixels in an image of a spatial area may be samples.

An interlayer video encoding apparatus and method and an interlayer video decoding apparatus and method according to an embodiment will now be described with reference to FIGS. 1A through 7.

Figure 1B:
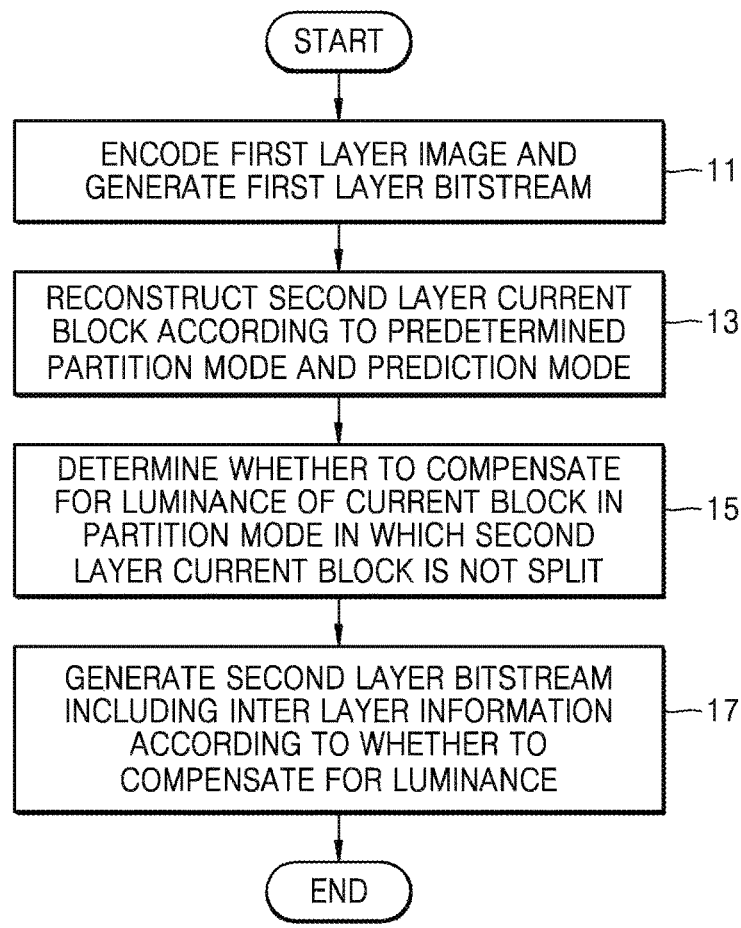
FIG. 1B is a flowchart of an interlayer video encoding method, according to various embodiments.

FIG. 1A is a block diagram of an interlayer video encoding apparatus 10, according to various embodiments. FIG. 1B is a flowchart of an interlayer video encoding method, according to various embodiments.

The interlayer video encoding apparatus 10 according to various embodiments may include a first layer encoder 12, a luminance compensation determiner 14, and a second layer encoder 16. The luminance compensation determiner 14 may be included in the second layer encoder 16. The luminance compensation determiner 14 may be located outside the second layer encoder 16.

The interlayer video encoding apparatus 10 according to various embodiments may classify and encode a plurality of image sequences for each layer according to scalable video coding and may output a separate stream including data encoded for each layer. The interlayer video encoding apparatus 10 may encode first layer image sequences and second layer image sequences according to different layers.

The first layer encoder 12 may encode first layer images and output a first layer stream including encoding data of the first layer images.

The second layer encoder 16 may encode second layer images and output a second layer stream including encoding data of the second layer images.

For example, according to scalable video coding based on spatial scalability, low resolution images may be encoded as the first layer images, and high resolution images may be encoded as the second layer images. An encoding result of the first layer images may be output in a first layer stream. An encoding result of the second layer images may be output in a second layer stream.

As another example, a multi-view video may be encoded according to scalable video coding. In this case, center view images may be encoded as first layer images, and left view images and right view images may be encoded as second layer images that refer to the first layer images. Alternatively, when the interlayer video encoding apparatus 10 permits three or more layers such as first, second, and third layers, the center view images may be encoded as the first layer images, the left view images may be encoded as the second layer images, and the right view images may be encoded as third layer images. However, the present invention is not necessarily limited thereto. Layers that the center view images, the left view images, and the right view images are encoded and referred may be changed.

As another example, scalable video coding may be performed according to temporal hierarchical prediction based on temporal scalability. A first layer stream including encoding information generated by encoding images of a base frame rate may be output. Temporal levels may be classified for each frame rate and may be respectively encoded in layers. A second layer stream including encoding information of a high speed frame rate may be output by further encoding images of the high frame rate with reference to the images of the basic frame rate.

Scalable video coding may be performed on a first layer and a plurality of second layers. In the presence of three or more second layers, first layer images, first second layer images, second second layers images, . . . , Kth second layer images may be encoded. Accordingly, an encoding result of the first layer images may be output in the first layer stream, and encoding results of the first second layer images, second second layers images, . . . , Kth second layer images may be respectively output in first, second, . . . Kth second layer streams.

The interlayer video encoding apparatus 10 according to various embodiments may perform inter prediction for predicting a current image by referring to images of a single layer. A motion vector indicating motion information between the current image and a reference image and a residual between the current image and the reference image may be generated through inter prediction.

The interlayer video encoding apparatus 10 may perform inter-layer prediction for predicting prediction information of second layer images by referring to prediction information of the first layer images.

When the interlayer video encoding apparatus 10 according to an embodiment permits three or more layers such as a first layer, a second layer, a third layer, etc., the interlayer video encoding apparatus 10 may perform inter-layer prediction between a first layer image and a third layer image and inter-layer prediction between a second layer image and the third layer image according to a multi-layer prediction structure.

A position differential component between the current image and a reference image of a different layer and a residual between the current image and the reference image of the different layer may be generated through inter-layer prediction.

An inter-layer prediction structure will be described in detail with reference to FIG. 3 later.

The interlayer video encoding apparatus 10 according to various embodiments encodes each video image for each respective block according to each layer. A block may have a square shape, a rectangular shape, or any geometric shape and is not limited to a data unit having a predetermined size. A block may be a maximum coding unit, a coding unit, a prediction unit, a transformation unit, or the like from among coding units according to a tree structure. The maximum encoding unit including coding units having the tree structure is diversely referred to as a coding block unit, a block tree, a root block tree, a coding tree, a coding root or a tree trunk. Video encoding and decoding methods based on coding units having the tree structure will now be described with reference to FIGS. 8 through 20.

Inter prediction and inter layer prediction may be performed based on a data unit of the coding unit, the prediction unit, or the transformation unit.

The first layer encoder 12 according to various exemplary embodiments may perform source coding operations including inter prediction or intra prediction on the first layer images to generate symbol data. The symbol data represents a sample value of each coding parameter and a sample value of the residual.

For example, the first layer encoder 12 may perform inter prediction, or intra prediction, transformation and quantization on samples in a data unit of the first layer images, generate symbol data, perform entropy encoding on the symbol data, and generate a first layer stream.

The second layer encoder 16 may encode the second layer images based on the coding units having the tree structure. The second layer encoder 16 may perform inter/intra prediction, transformation and quantization on samples in a data unit of the second layer images, generate symbol data, perform entropy encoding on the symbol data, and generate an second layer stream.

The second layer encoder 16 according to various embodiments may perform inter layer prediction that predicts a second layer image by using prediction information of a first layer image. The second layer encoder 16 may determine prediction information of a second layer current image by using prediction information of a first layer reconstructed image and generate a second layer prediction image based on the determined prediction information to encode a prediction error between a second layer original image and the second layer prediction image, in order to encode the second layer original image among the second layer image sequences through the inter layer prediction structure.

The second layer encoder 16 may perform inter layer prediction on the second layer image for each block such as the coding unit or the prediction unit and determine a block of the first layer image to which a block of the second layer image is to refer. For example, a reconstruction block of the first layer image positioned in correspondence to a position of a current block image in the second layer image may be determined. The second layer encoder 16 may determine a second layer prediction block by using the first layer reconstruction block corresponding to the second layer block.

The second layer encoder 16 may use the second layer prediction block determined by using the first layer reconstruction block as a reference image for inter layer prediction of a second layer original block. The second layer encoder 16 may perform entropy encoding on an error between a sample value of the second layer prediction block and a sample value of the second layer original block, i.e., a residual according to inter layer prediction, using the first layer reconstruction image.

As described above, the interlayer video encoding apparatus 10 may encode a current layer image sequence by referring to first layer reconstruction images through the inter layer prediction structure. However, the interlayer video encoding apparatus 10 according to various embodiments may encode the second layer image sequence according to a single layer prediction structure without referring to different layer samples. Thus, it is not limited to construe that the second layer encoder 16 performs only inter-layer prediction in order to encode the second layer image sequence.

As described above, when the interlayer video encoding apparatus 10 encodes a multi-view video, the first layer encoder 12 may encode a first view video, and the second layer encoder 16 may encode a second view video. Video for each view may be captured by different cameras or may be acquired using different lenses. Since characteristics of a capturing angle, illumination, or an imaging tool (a camera, a lens, etc.) for each view may be different, a phenomenon may occur whereby luminance is not identical between videos acquired for each view. Such a luminance mismatch phenomenon may be related to a difference in a sample value between videos for each view.

If luminance is not identical between videos for each view, since the amount of interlayer prediction errors further increases, encoding efficiency may be reduced. Accordingly, considering luminance inconsistency between views, the luminance compensation determiner 14 of the interlayer video encoding apparatus 10 may compensate for and encode a luminance difference of video for each view. For example, a luminance difference between a first view image encoded by the first layer encoder 12 and a second view image encoded by the second layer encoder 16 may be encoded. Since the luminance difference of the second view image with respect to the first view image is encoded, luminance may be compensated for when the second layer encoder 16 encodes a second view video.

A predetermined parameter may be used to compensate for a luminance difference between a first layer block and a second layer block according to an embodiment. For example, as shown in Equation 1 below, a scale factor a and an offset value b may be used to acquire a result P' by compensating for luminance with respect to a pixel P of a current block corresponding to a different layer.

$$P' = aXP + b \qquad \text{[Equation 1]}$$

The parameter for compensating for the luminance difference in a block unit may be transmitted by being included in a bitstream or may be induced by utilizing peripheral pixel values of a second layer current block and peripheral pixel values of a first layer reconstruction block corresponding to the current block.

Meanwhile, since residuals are predicted between layers in an inter layer prediction structure, an encoding operation of predicting a luminance difference between layers may increase an amount of arithmetic operations. Accordingly, the luminance compensation determiner 14 according to various embodiments may determine whether to perform luminance compensation in consideration of characteristics in a predetermined data unit such as a slice of a current image or a block.

A detailed operation of the interlayer video encoding apparatus 10 that considers compensation of luminance will be described with reference to FIG. 1B below.

FIG. 1B is a flowchart of an interlayer video encoding method, according to various embodiments.

In operation 11, the first layer encoder 12 may encode a first layer image and generate a first layer bitstream including sample values of generated encoding information.

In operation 13, the second layer encoder 16 may encode a second layer image and reconstruct a second layer current block that is determined as a predetermined partition mode and prediction mode, in order to generate a second layer bitstream including sample values of generated encoding information. That is, the second layer encoder 16 may reconstruct the second layer current block using a first layer reference block corresponding to the second layer current block that is to be reconstructed in a first layer reconstruction image according to the predetermined partition mode and prediction mode. It may be interpreted that if the interlayer video encoding apparatus 10 encodes a multiview video, the first layer image corresponds to a first view image, and the second layer image corresponds to a second view image. The first layer encoder 12 and the second layer encoder 16 may split each image into blocks and encode each image for each respective block.

In operation 15, the luminance compensation determiner 14 may determine whether to perform luminance compensation on the second layer current block in the partition mode in which the second layer current block is not split. In this regard, the partition mode in which the second layer current block is not split may mean that a partition mode of a current block is a 2N×2N partition mode when a size of the current block is 2N×2N.

In operation 17, the second layer encoder 16 may generate a second layer bitstream including inter layer prediction information between the second layer current block of which luminance is determined according to whether to perform luminance compensation and the first layer reference block.

For example, the second layer encoder 16 may generate the second layer bitstream including partition mode information, prediction mode information, and luminance compensation information for a second layer reconstruction block of the partition mode in which the second layer current block is not split and of a prediction mode other than an intra prediction mode. The second layer encoder 16 may perform inter layer prediction that encodes an error between the first layer image and the second layer image, and thus residuals between blocks (second layer blocks) of the second layer image and reference blocks (first layer reference blocks) of the first layer image corresponding to the blocks of the second layer image may be encoded. Thus, the second layer bitstream may include various pieces of inter layer prediction information indicating inter layer encoding methods and inter layer residuals.

Operations 13 and 15 will now be described in more detail.

The second layer encoder 16 may determine partition mode information indicating a partition mode of a second layer block and prediction mode information indicating a prediction mode of the second layer block. For example, the partition mode information of the second layer block may be determined in a merge mode or advanced motion vector prediction (AMVP) mode. The second layer encoder 16 may reconstruct the second layer current block by using the first layer reference block corresponding to the second layer current block that is to be reconstructed in the first layer reconstruction image according to the predetermined partition mode and prediction mode.

The luminance compensation determiner 14 may determine whether to perform luminance compensation on the second layer block determined using the first layer reference block corresponding to the second layer block in the first layer reconstruction image. That is, the luminance compensation determiner 14 may determine whether to perform luminance compensation on the second layer block determined as the predetermined partition mode and prediction mode. For example, the luminance compensation determiner 14 may determine luminance compensation information indicating whether to perform luminance compensation on the second layer block when the partition mode information of the second layer block is the partition mode in which the second layer current block is not split and the prediction mode is not an intra prediction mode.

For example, the luminance compensation determiner 14 may determine luminance compensation information for a block indicating that the partition mode information is a 2N×2N partition mode.

For example, the luminance compensation determiner 14 may determine luminance compensation information for a block indicating that the partition mode information is a 2N×2N type and the prediction mode information is not the intra prediction mode.

The luminance compensation determiner 14 may determine luminance compensation information for the current block included in a slice determined to use luminance compensation based on the partition mode information and the prediction mode information.

The luminance compensation determiner 14 may omit an operation of determining whether to perform luminance compensation on second layer blocks except for the block determined as the predetermined partition mode and prediction mode.

The second layer encoder 16 may not perform residual prediction, on the second layer block determined to have luminance compensation performed thereon, that predicts residual information of the second layer block using residual information of at least one reference block of a time direction reference block and an interlayer direction reference block. Thus, information indicating whether to perform residual prediction may be determined with respect to only a block (a slice or a picture) determined not to have luminance compensation performed thereon?.

The second layer encoder 16 may not perform a luminance compensation operation, between luminance of the first layer reference block and luminance of the second layer block, on the second layer block determined to perform residual prediction that predicts the residual information of the second layer block by using the residual information of at least one reference block of the time direction reference block and the interlayer direction reference block.

The luminance of the second layer block may be determined through compensation of the luminance or without compensating for the luminance according to determination of the luminance compensation determiner 14. Thus, in operation 17, the second layer encoder 16 may generate the second layer bitstream including the inter layer prediction information between the second layer current block of which luminance is determined according to whether to perform luminance compensation and the first layer reference block.

If the luminance of the second layer image is adjusted in consideration of the first layer image, since errors between the first layer image and the second layer image are further reduced, encoding efficiency of inter layer prediction may be improved. Compensation of luminance may be prioritized in a specific encoding mode according to an encoding mode of a block.

The interlayer video encoding apparatus 10 according to various embodiments may include a central processor (not shown) that generally controls the first layer encoder 12, the luminance compensation determiner 14, and the second layer encoder 16. Alternatively, the first layer encoder 12, the luminance compensation determiner 14, and the second layer encoder 16 may operate by their respective processors (not shown), and the interlayer video encoding apparatus 10 may generally operate according to interactions of the processors (not shown). Alternatively, the first layer encoder 12, the luminance compensation determiner 14, and the second layer encoder 16 may be controlled according to the control of an external processor (not shown) of the interlayer video encoding apparatus 10.

The interlayer video encoding apparatus 10 may include one or more data storage units (not shown) in which input and output data of the first layer encoder 12, the luminance compensation determiner 14, and the second layer encoder 16 is stored. The interlayer video encoding apparatus 10 may include a memory control unit (not shown) that observes data input and output of the data storage units (not shown).

The interlayer video encoding apparatus 10 may operate in connection with an internal video encoding processor or an external video encoding processor so as to output video encoding results, thereby performing a video encoding operation including transformation. The internal video encoding processor of the interlayer video encoding apparatus 10 may be implemented by a central processor or a graphic processor as well as a separate processor.

Figure 2A:
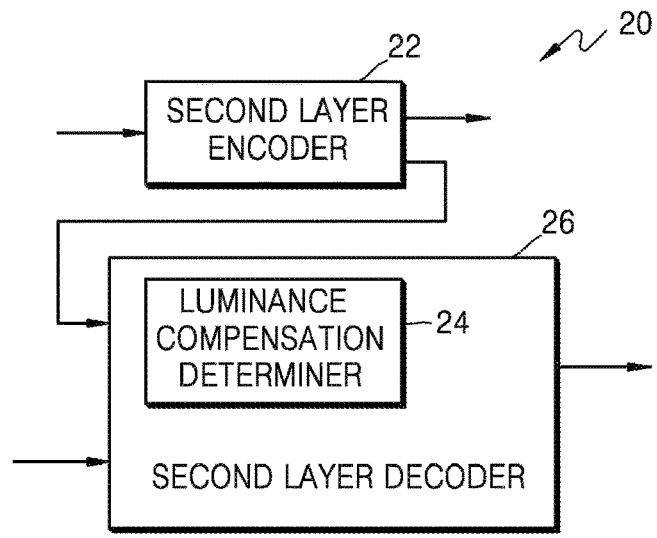
FIG. 2A is a block diagram of an interlayer video decoding apparatus, according to various embodiments.

FIG. 2A is a block diagram of an interlayer video decoding apparatus 20, according to various embodiments.

The interlayer video decoding apparatus 20 according to various embodiments may include a second layer encoder 22, a luminance compensation determiner 24, and a second layer decoder 26. The luminance compensation determiner 24 may be included in the second layer decoder 26. The luminance compensation determiner 24 according to another embodiment may be located outside the second layer decoder 26.

The interlayer video decoding apparatus 20 according to various embodiments may receive bitstreams for each layer according to scalable encoding. The number of layers of the bitstreams received by the interlayer video decoding apparatus 20 is not limited. However, for convenience of description, an embodiment in which the second layer encoder 22 of the interlayer video decoding apparatus 20 receives and decodes a first layer stream and the second layer decoder 26 receives and decodes a second layer stream will be described in detail.

For example, the interlayer video decoding apparatus 20 based on spatial scalability may receive streams in which image sequences of different resolutions are encoded according to different layers. A low resolution image sequence may be reconstructed by decoding the first layer stream, and a high resolution image sequence may be reconstructed by decoding the second layer stream.

As another example, a multi-view video may be decoded according to scalable video coding. When a stereoscopic video stream is received in multiple layers, the first layer stream may be decoded to reconstruct left view images. The second layer stream may be further decoded to the first layer stream to reconstruct right view images.

Alternatively, when a multi-view video stream is received in multiple layers, the first layer stream may be decoded to reconstruct center view images. The second layer stream may be further decoded to the first layer stream to reconstruct the left view images. A third layer stream may be further decoded to the first layer stream to reconstruct the right view images.

As another example, scalable video coding based on temporal scalability may be performed. The first layer stream may be decoded to reconstruct base frame rate images. The second layer stream may be further decoded to the first layer stream to reconstruct high speed frame rate images.

In the presence of three or more second layers, first layer images may be reconstructed from the first layer stream. If the second layer stream is further decoded by referring to the first layer reconstruction images, second layer images may be further reconstructed. If a Kth layer stream is further decoded by referring to the second layer reconstruction images, Kth layer images may be further reconstructed.

The interlayer video decoding apparatus 20 may obtain encoded data of the first layer images and second layer images from the first layer stream and the second layer stream and may further obtain a motion vector generated through inter prediction and prediction information generated through inter layer prediction.

For example, the interlayer video decoding apparatus 20 may decode inter-predicted data for each layer and may decode inter layer-predicted data between a plurality of layers. Reconstruction may be performed through motion compensation and inter layer decoding based on a coding unit or a prediction unit.

Motion compensation for a current image is performed by referring to reconstruction images predicted through inter prediction of a same layer on each layer stream, and thus images may be reconstructed. Motion compensation means an operation of synthesizing a reference image determined by using a motion vector of the current image and a residual of the current image and reconfiguring a reconstruction image of the current image.

The interlayer video decoding apparatus 20 may perform inter-layer decoding with reference to prediction information of the first layer images so as to decode a second layer image predicted through inter-layer prediction. Inter-layer decoding means an operation of reconfiguring a reconstruction image of the current image by synthesizing a reference image of a different layer determined to predict a current image and a residual of the current image.

The interlayer video decoding apparatus 20 according to an embodiment may perform inter-layer decoding for reconstructing the third layer images predicted with reference to the second layer images. An interlayer prediction structure will be described in detail with reference to FIG. 3 later.

However, the second layer encoder 26 according to various embodiments may decode the second layer stream without referring to the first layer image sequence. Thus, it is not limited to construe that the second layer encoder 26 performs only inter-layer prediction in order to decode the second layer image sequence.

The interlayer video decoding apparatus 20 decodes each image of a video for each block. A block according to an exemplary embodiment may include a maximum encoding unit, an encoding unit, a prediction unit, a transformation unit, etc. among encoding units according to a tree structure.

The first layer encoder 22 may decode the first layer image by using encoding symbols of a parsed first layer image. If the interlayer video decoding apparatus 20 receives encoded streams based on coding units having a tree structure, the first layer encoder 22 may perform decoding based on the coding units having the tree structure for each maximum coding unit of the first layer stream.

The first layer encoder 22 may perform entropy encoding for each maximum coding unit and may obtain encoding information and encoded data. The first layer encoder 22 may perform inverse quantization and inverse transformation on the encoded data obtained from streams to reconstruct a residual. The first layer encoder 22 according to another embodiment may directly receive a bitstream of quantized transformation coefficients. A residual of the images may be reconstructed as a result of performing inverse quantization and inverse transformation on the quantized transformation coefficients.

The first layer encoder 22 may reconstruct the first layer images by synthesizing a prediction image and the residual through motion compensation between same layer images.

The second layer encoder 26 may generate a second layer prediction image by using samples of a first layer reconstruction image according to the inter layer prediction structure. The second layer encoder 26 may decode the second layer stream to obtain a prediction error according to inter layer prediction. The second layer encoder 26 may combine the second layer prediction image and the prediction error, thereby generating the second layer reconstruction image.

The second layer encoder 26 may determine the second layer prediction image using the first layer reconstruction image decoded by the first layer encoder 22. The second layer encoder 26 may determine a block of the first layer image to which a block such as a coding unit or a prediction unit of the second layer image is to refer according to the inter layer prediction structure. That is, a block of the first layer image to which a block of the second layer image is to refer may be determined. For example, a reconstruction block of the first layer image located in the second layer image in correspondence to a location of a current block may be determined. The second layer encoder 26 may determine a second layer prediction block using a first layer reconstruction block corresponding to a second layer block.

The second layer encoder 26 may use the second layer prediction block determined using the first layer reconstruction block according to an interlayer prediction structure as a reference image for interlayer predicting a second layer original block. In this case, the second layer encoder 26 may reconstruct the second layer block by synthesizing a sample value of the second layer prediction block determined using the first layer reconstruction image and a residual according to interlayer prediction.

According to spatial scalable video coding, when the first layer decoder 22 reconstructs the first layer image of a different resolution from that of the second layer image, the second layer decoder 26 may interpolate the first layer reconstruction image to resize the first layer reconstruction image to have the same resolution as that of the second layer original image. The interpolated first layer reconstruction image may be determined as the second layer prediction image for interlayer prediction.

Therefore, the first layer decoder 22 of the interlayer video decoding apparatus 20 may reconstruct the first layer image sequence by decoding the first layer stream, and the second layer decoder 26 may reconstruct the second layer image sequence by decoding the second layer stream.

In consideration of a luminance mismatch between views, the luminance compensation determiner 24 of the interlayer video decoding apparatus 20 may compensate for and reconstruct a luminance difference between videos for each view. For example, a luminance difference between a first view image decoded by the first layer decoder 22 and a second view image decoded by the second layer decoder 26 may be acquired from a bitstream. Since the luminance difference between the second view image and the first view image is acquired, it may be determined whether to perform luminance compensation when the second layer decoder 26 decodes a second view video.

The luminance compensation determiner 24 according to various embodiments may determine whether to perform luminance compensation in consideration of characteristics of a predetermined data unit such as a slice of a current image or a block.

A detailed operation of the interlayer video decoding apparatus 20 that considers compensation of luminance will now be described with reference to FIG. 2B.

Figure 2B:
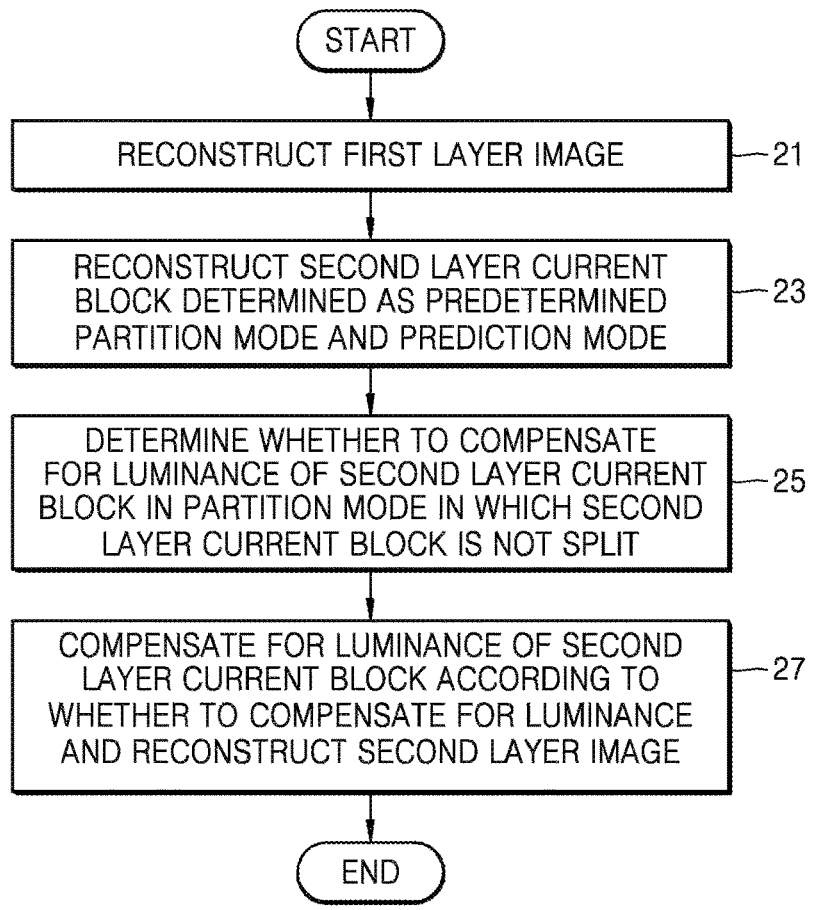
FIG. 2B is a flowchart of an interlayer video decoding method, according to various embodiments.

FIG. 2B is a flowchart of an interlayer video decoding method, according to various embodiments.

In operation 21, the first layer decoder 22 may reconstruct a first layer image based on encoding information acquired from a first layer bitstream.

In operation 23, the second layer decoder 26 may determine a second layer reconstruction block using a first layer reference block corresponding to a second layer block in a first layer reconstruction image according to an interlayer prediction structure.

That is, the second layer decoder 26 may determine a partition mode and a prediction mode of a second layer current block by using the inter layer prediction information acquired from a second layer bitstream and using the first layer reference block corresponding to a current block that is to be reconstructed from a second layer in the first layer reconstruction image.

In operation 25, the luminance compensation determiner 24 may determine whether to perform luminance compensation on the second layer current block in a partition mode in which the second layer current block is not split. In this regard, the partition mode in which the second layer current block is not split may be a 2N×2N partition mode.

In operation 27, the second layer decoder 26 may perform luminance compensation on the second layer current block according to whether to perform luminance compensation and reconstruct the second layer image including the second layer current block on which luminance compensation is performed. The second layer decoder 26 may compensate for a luminance difference between the first layer reference block and the second layer block in order to reconstruct the second layer block that is determined to perform luminance compensation thereon by the luminance compensation determiner 24. In this regard, information regarding the luminance difference between layers may be acquired from a bitstream. Alternatively, the information regarding the luminance difference between layers may be induced by utilizing peripheral pixel values of the second layer current block and peripheral pixel values of the first layer reconstruction block corresponding to the current block. Alternatively, a luminance value of the second layer block may be compensated for by as much as a preset luminance.

According to an embodiment, luminance compensation may overlap with inter layer prediction. A reconstruction sample of the second layer block may be determined by additionally compensating for luminance of a sample of the second layer block determined by compensating for a residual of a reconstruction sample of the first layer block according to the inter layer prediction structure.

According to another embodiment, luminance compensation may not be performed simultaneously with inter layer prediction. Since a luminance difference may be included in a residual between layers according to the inter layer prediction structure, the luminance of the sample of the second layer block determined by compensating for the residual of the reconstruction sample of the first layer block according to the inter layer prediction structure may not be compensated for. However, luminance of the second layer block in which the residual between layers is not compensated for may be compensated for.

Operation 25 will now be described in more detail.

The luminance compensation determiner 24 may acquire partition mode information and prediction mode information of a second layer block from a second layer bitstream. The luminance compensation determiner 24 may acquire luminance compensation information for the second layer block from the second layer bitstream when the partition mode information is the partition mode in which the second layer current block is not split and the prediction mode is not an intra prediction mode. For example, the prediction mode information of the second layer block may be determined by a merge mode or advanced motion vector prediction (AMVP) mode.

The luminance compensation determiner 24 may determine whether to perform luminance compensation on the second layer block, based on the luminance compensation information for the second layer block.

The luminance compensation determiner 24 may acquire luminance compensation information for a block indicating that a size of the second layer block is 2N×2N and the partition mode information is a 2N×2N partition mode.

The luminance compensation determiner 24 may acquire luminance compensation information for a block indicating that the partition mode information is a 2N×2N type and the prediction mode information is not the intra prediction mode.

As another example, the luminance compensation determiner 24 may acquire luminance compensation information for the current block included in a slice determined to use luminance compensation based on the partition mode information and the prediction mode information.

The luminance compensation determiner 24 may omit an operation of determining whether to perform luminance compensation on second layer blocks except for the block determined as the predetermined partition mode and prediction mode.

The luminance compensation determiner 24 according to an embodiment may acquire information indicating whether to perform residual prediction on only a block (a slice or a picture) determined not to have luminance compensation performed thereon. Thus, the luminance compensation determiner 24 may not perform residual prediction on the second layer block determined to have luminance compensation performed thereon, that predicts residual information of the second layer block using residual information of at least one reference block of a time direction reference block and an interlayer direction reference block.

The luminance compensation determiner 24 according to another embodiment may acquire information indicating whether to perform luminance compensation on only a block (a slice or a picture) determined not to have residual prediction performed thereon. Thus, the luminance compensation determiner 24 may not perform luminance compensation on the second layer block determined to have performed thereon residual prediction that predicts the residual information of the second layer block by using the residual information of at least one reference block of the time direction reference block and the interlayer direction reference block, by compensating for a luminance difference of a sample value of the first layer reference block and determining a sample value of the second layer block.

However, according to the interlayer encoding method, a partition mode or a prediction mode of the second layer block may be determined in the same way as a partition mode and a prediction mode of the first layer block corresponding to the second layer block. In this case, although the luminance compensation determiner 24 is disposed outside the second layer decoder 26, the partition mode and the prediction mode of the second layer block may be predicted using sample values of the partition mode information and the prediction mode information of the first layer block. Thus, the luminance compensation determiner 24 may determine whether to perform luminance compensation on the second layer block based on the predicted partition mode and prediction mode of the second layer block.

The interlayer video decoding apparatus 20 according to various embodiments may include a central processor (not shown) that generally controls the first layer decoder 22, the luminance compensation determiner 24, and the second layer decoder 26. Alternatively, the first layer decoder 22, the luminance compensation determiner 24, and the second layer decoder 26 may operate by their respective processors (not shown), and the interlayer video decoding apparatus 20 may generally operate according to interactions of the processors (not shown). Alternatively, the first layer decoder 22, the luminance compensation determiner 24, and the second layer decoder 26 may be controlled according to the control of an external processor (not shown) of the interlayer video decoding apparatus 20.

The interlayer video decoding apparatus 20 according to various embodiments may include one or more data storage units (not shown) in which input and output data of the first layer decoder 22, the luminance compensation determiner 24, and the second layer decoder 26 is stored. The interlayer video decoding apparatus 20 may include a memory control unit (not shown) that observes data input and output of the data storage units (not shown).

The interlayer video decoding apparatus 20 according to various embodiments may operate in connection with an internal video decoding processor or an external video decoding processor so as to output video decoding results, thereby performing a video decoding operation including transformation. The internal video decoding processor of the interlayer video decoding apparatus 20 may be implemented by a central processor or a graphic processor as well as a separate processor.

Referring to FIGS. 2A and 2B, the interlayer video decoding apparatus 20 may compensate for a luminance difference between images or views of different layers with respect to a specific type of block or slice during a process of decoding the second layer image, and thus luminance between the first layer reconstruction image and the second layer reconstruction image may be uniform. Referring to FIGS. 1A and 1B, the interlayer video encoding apparatus 10 may perform luminance compensation between images of different layers with respect to a specific type of block or slice, and thus a residual between a prediction image and an original image may be reduced.

A luminance compensation application range of a multi-layer image is appropriately restricted, thereby maintaining encoding efficiency and reducing complexity.

Figure 3:
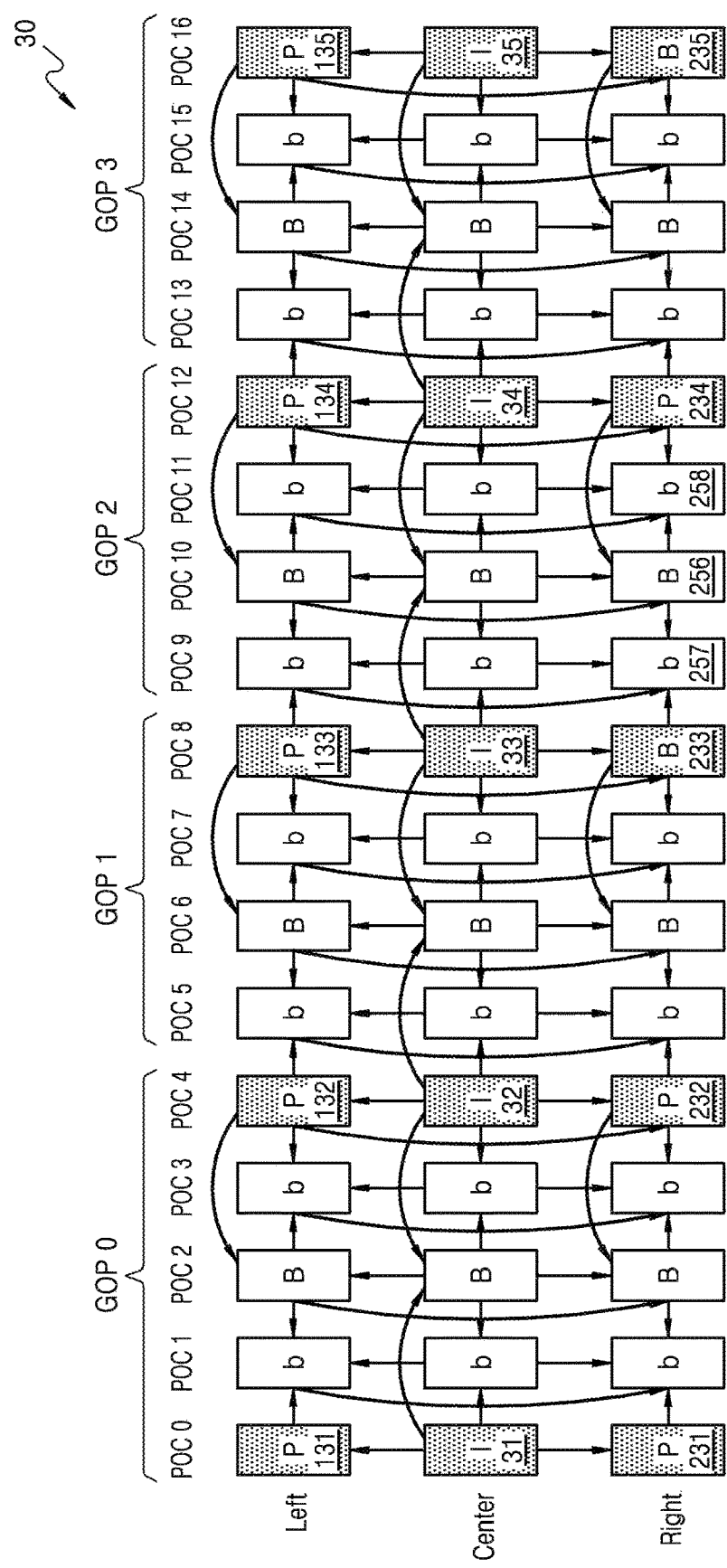
FIG. 3 illustrates an inter-layer prediction structure, according to an embodiment.

FIG. 3 illustrates an inter-layer prediction structure, according to an embodiment.

The inter layer video encoding apparatus 10 according to an embodiment may prediction encode base view images, left view images, and right view images according to a reproduction order 30 of a multi-view video prediction structure shown in FIG. 3.

According to the reproduction order 30 of the multi-view video prediction structure of the related art, images of the same view may be arranged in a horizontal direction. Thus, left view images "Left" may be arranged in a line in the horizontal direction, base view images "Center" may be arranged in a line in the horizontal direction, and right view images "Right" may be arranged in a line in the horizontal direction. The base view images may be center view images compared to the left and right view images.

Images having the same POC order may be arranged in a vertical direction. A POC of images is a reproduction order of images constituting video. "POC X" in the reproduction order 30 of the multi-view video prediction structure indicates a relative reproduction order of images positioned in a corresponding column. The smaller the number of X, the earlier the reproduction order, and the greater the number of X, the later the reproduction order.

Therefore, according to the reproduction order 30 of the multi-view video prediction structure of the related art, the left view images "Left" may be arranged in the horizontal direction according to the POC (reproduction order), the base view images "Center" may be in the horizontal direction according to the POC (reproduction order), and the right view images "Right" may be arranged in the horizontal direction according to the POC (reproduction order). The left and right view images positioned in the same column as that of the base view images have different views but have the same POC (reproduction order).

Four consecutive images of view images constitute a single GOP. Each GOP includes images between consecutive anchor pictures and a single key picture.

An anchor picture is a random access point. In this regard, when a predetermined reproduction position is selected from images that are arranged according to a reproduction order of video, that is, according to a POC, an anchor picture of which a POC is closest to the reproduction position is reproduced. The base view images include base view anchor pictures 31, 32, 33, 33, and 35, the left view images include left view anchor pictures 131, 132, 133, 134, and 135, and the right view images include right view anchor pictures 231, 232, 233, 234, and 235.

Multi-view images may be reproduced and predicted (restored) according to a GOP order. According to the reproduction order 30 of the multi-view video prediction structure, images included in a GOP 0 are reproduced according to views and then images included in a GOP 1 may be reproduced. That is, images included in each GOP may be reproduced in the order of GOP 0, GOP 1, GOP 2, and GOP 3. According to a coding order of the multi-view video prediction structure, the images included in the GOP 0 are predicted (restored) according to views and then the images included in the GOP 1 may be predicted (restored). That is, the images included in each GOP may be reproduced in the order of GOP 0, GOP 1, GOP 2, and GOP 3.

According to the reproduction order 30 of the multi-view video prediction structure, both inter-view prediction (inter layer prediction) and inter prediction may be performed on images. In the multi-view video prediction structure, an image from which an arrow starts, and an image to which an arrow is directed is an image that is predicted by using the reference image.

A predicting result of the base view images may be encoded and then may be output in the form of a base view image stream, and a prediction result of the additional view images may be encoded and then may be output in the form of a layer bitstream. In addition, a predicting result of the left view images may be output in a first layer bitstream and a predicting result of the right view images may be output in a second layer bitstream.

Only inter prediction is performed on base view images. That is, the anchor pictures 51, 52, 53, 54, and 55 that are I-picture type pictures do not refer to different images, whereas the remaining images that are B-picture type images and b-picture type images are predicted with reference to different base view images. The B-picture type images are predicted with reference to an I-picture type anchor picture having a preceding POC order and an I-picture type anchor picture having a later POC order. B-picture type images are predicted with reference to an I-picture type anchor picture having a preceding POC order and a B-picture type image having a later POC order or a B-picture type image having a preceding POC order and an I-picture type anchor picture having a later POC order.

Inter-view prediction (inter layer prediction) referring to different view images and inter prediction referring to the same view images are respectively performed on the left view images and the right view images.

Inter-view prediction (inter layer prediction) may be performed on the left view anchor pictures 131, 132, 133, 134, and 135, respectively, with reference to the base view anchor pictures 31, 32, 33, 34, and 35 having the same POC order. Inter-view prediction may be performed on the right view anchor pictures 231, 232, 233, 234, and 235, respectively, with reference to the base view anchor pictures 31, 32, 33, 34, and 35 or the left view anchor pictures 131, 132, 133, 134, and 135 having the same POC order. Inter-view prediction (inter layer prediction) referring to different view images having the same POC order may be performed on remaining merge images among the left view images and the right view images, other than the anchor pictures 131, 132, 133, 134, 135, 231, 232, 233, 234, and 235.

The remaining merge images among the left view images and the right view images, other than the anchor pictures 131, 132, 133, 134, 135, 231, 232, 233, 234, and 235 are predicted with reference to the same view images.

However, the left view images and the right view images may not be predicted with reference to an anchor picture having a previous reproduction order among additional view images of the same view. That is, for inter prediction of a current left view image, the left view images except for a left view anchor picture having a reproduction order previous to that of the current left view image may be referred to. Likewise, for inter prediction of a current right view image, the right view images except for a right view anchor picture having a reproduction order previous to that of the current right view image may be referred to.

For inter prediction of the current left view image, prediction may be performed by not referring to a left view image that belongs to a GOP previous to a current GPO to which the current left view belongs but by referring to a left view image that belongs to the current GOP and is to be reconstructed before the current left view image. The right view image is the same as described above.

The inter layer video decoding apparatus 20 according to an embodiment may prediction encode base view images, left view images, and right view images according to the reproduction order 30 of a multi-view video prediction structure shown in FIG. 3.

The left view images may be reconstructed via inter-view disparity compensation referring to the base view images and inter-view motion compensation referring to the left view images. The right view images may be reconstructed via inter-view disparity compensation referring to the base view images and the left view images and inter-view motion compensation referring to the right view images. Reference images need to be firstly reconstructed for disparity compensation and motion compensation of the left view images and the right view images.

For inter-view motion compensation of the left view images, the left view images may be reconstructed via inter-view motion compensation referring to reconstructed left view reference images. For inter-view motion compensation of the right view images, the right view images may be reconstructed via inter-view motion compensation referring to reconstructed right view reference images.

For inter-view motion compensation of the current left view image, prediction may be performed by not referring to a left view image that belongs to a GOP previous to a current GPO to which the current left view belongs but by referring to a left view image that belongs to the current GOP and is to be reconstructed before the current left view image. The right view image is the same as described above.

As described above, the interlayer video encoding apparatus 10 and the interlayer video decoding apparatus 20 may determine whether to perform luminance compensation according to image characteristics. The interlayer video encoding apparatus 10 and the interlayer video decoding apparatus 20 may determine whether to perform luminance compensation for each slice or block.

The interlayer video encoding apparatus 10 and the interlayer video decoding apparatus 20 may compensate for luminance of not only a luma block but also a chroma block in the same way.

For example, a coding unit having a size of 2N×2N may be split into prediction units having sizes 2N×2N, N×2N, 2N×N, or N×N. In this regard, partition mode information indicating shapes of the prediction units may be determined as 2N×2N, N×2N, 2N×N, or N×N. In this regard, according to an embodiment, it may be determined whether to perform luminance compensation on only a block having a partition mode of 2N×2N.

As another example, it may be determined whether to perform luminance compensation on a current block based on encoding characteristics such as a picture type of a picture to which a block belongs, a temporal level, a network abstraction unit (NAL) type, and a distance between a current image and a reference image in temporal prediction. According to the encoding characteristics, an encoding mode having a high possibility of statistically needing luminance compensation may be preset. It may be determined whether to perform luminance compensation on a block of a preset encoding mode.

As another example, it may be determined whether to perform luminance compensation according to an encoding mode determined for each block. For example, when a block is in a predetermined encoding mode in each slice, luminance compensation information indicating whether to perform luminance compensation may be transmitted or received as slice data or a slice header. Alternatively, when a block is in a predetermined encoding mode in each picture, luminance compensation information indicating whether to perform luminance compensation may be transmitted or received as a PPS or picture related data.

For example, it may be determined whether to perform luminance compensation on a block determined according to rate-distortion optimization based on a prediction direction and a coding unit of the block.

A method of determining whether to perform luminance compensation according to various embodiments will now be described with reference to FIGS. 4 through 6 below.

An embodiment in which it is determined whether to perform luminance compensation when a partition mode of a current block is 2N×2N will now be described with reference to FIG. 4 below. Embodiments of syntax for performing luminance compensation based on a partition mode of a current block will now be described with reference to FIGS. 5 and 6 below.

Figure 4:
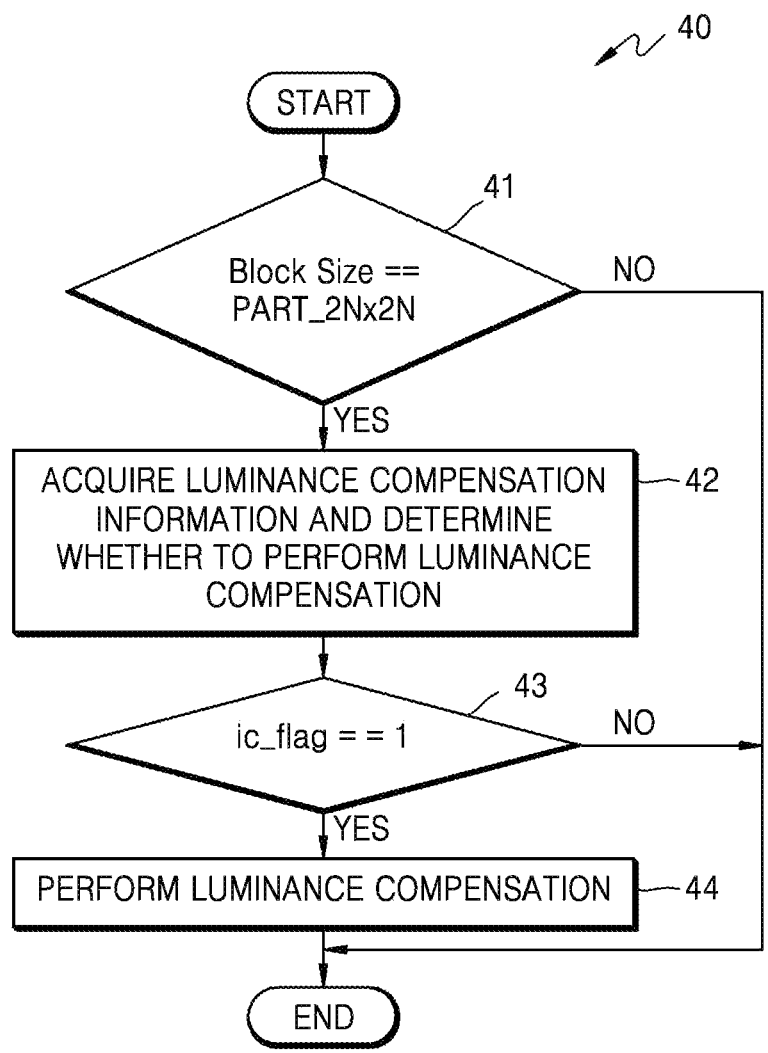
FIG. 4 is a flowchart of a method in which an interlayer video decoding apparatus performs luminance compensation, according to an embodiment.

FIG. 4 is a flowchart of a method in which the interlayer video decoding apparatus 20 performs luminance compensation, according to an embodiment.

In operation 41, the luminance compensation determiner 24 of the interlayer video decoding apparatus 20 may acquire prediction mode information and partition mode information of a current block and determine whether a partition mode of the current block is a 2N×2N partition mode. If the partition mode of the current block is not the 2N×2N partition mode, the luminance compensation determiner 24 may end a process 40 without determining whether to perform luminance compensation.

However, in operation 41, if the partition mode of the current block is the 2N×2N partition mode, in operation 42, the luminance compensation determiner 24 may determine whether to perform luminance compensation and acquire ic_flag.

In operation 42, the luminance compensation determiner 24 may acquire luminance compensation information of the current block "ic_flag" and determine whether to perform luminance compensation from the luminance compensation information "ic_flag". The luminance compensation information of the current block "ic_flag" may be acquired from a received stream or may be determined according to an encoding mode such as a coding type or a prediction direction of the current block. The luminance compensation determiner 24 may set "ic_flag" as 0 if not receiving "ic_flag" from a bistream.

In operation 43, the luminance compensation determiner 24 may determine whether the luminance compensation information "ic_flag" is 1, and, in operation 44, may perform luminance compensation on a block on which luminance compensation is to be performed.

Meanwhile, although an example in which the interlayer video decoding apparatus 20 determines whether to perform luminance compensation in operations 41 through 44, it can be understood by one of ordinary skill in the art that the method described with reference to FIG. 4 may be performed by the interlayer video encoding apparatus 10.

FIG. 5 illustrates an example of syntax for performing luminance compensation based on a partition mode of a current block, according to an embodiment.

Syntax coding_unit( ) 50 for a current block may include conditional sentences 56 and 57 for determining whether to perform luminance compensation on the current block.

In the conditional sentence 56, when the current block is a skip mode (skip_flag[x0][y0]), if luminance compensation is possible on blocks in a slice (icEnableFlag==1), the luminance compensation information "ic_flag" may be used to indicate whether to perform luminance compensation for the current block.

For example, "ic_flag" is set as 1 when luminance compensation on the current block is used, and "ic_flag" is set as 0 or may not appear when luminance compensation on the current block is not used.

FIG. 6 illustrates another example of syntax for performing luminance compensation based on a partition mode of a current block, according to an embodiment.

Syntax cu_extension( ) 60 for a current block may include a conditional sentence 61 for determining whether to perform luminance compensation on the current block (ic_flag==1).

In the conditional sentence 61, if luminance compensation is possible on blocks in a slice (icEnableFlag==1), the luminance compensation information "ic_flag" may be used to indicate whether to perform luminance compensation for the current block.

Therefore, when semantics of the syntax cu_extension ( )60 may be defined to determine whether to perform luminance compensation ((icEnableFlag==1?) on the current block when a partition mode of the current block is 2N×2N. In more detail, the interlayer video decoding apparatus 20 may determine whether to perform luminance compensation ((icEnableFlag==1?) when the partition mode of the current block is 2N×2N, luminance compensation is set to be possible on a slice on which the current block belongs (slice_ic_enable_flag==1), and a prediction mode of the current block is not an intra mode (CuPredMode[x0][y0] !=MODE_INTRA).

In the conditional sentence 61, when luminance compensation is possible, "ic_flag" is set as 1 if luminance compensation on the current block is used, and "ic_flag" is set as 0 or may not appear if luminance compensation on the current block is not used.

The interlayer video encoding apparatus 10 and the interlayer video decoding apparatus 20 that determine whether to perform luminance compensation on a block for each image characteristic have been described with reference to FIGS. 1A through 6 above. If luminance compensation is performed on all blocks, since operation load may increase, the interlayer video encoding apparatus 10 and the interlayer video decoding apparatus 20 may determine whether to perform luminance compensation on only a block satisfying a predetermined condition and may not determine whether to perform luminance compensation on a block that does not satisfy the predetermined condition and may not perform luminance compensation.

Therefore, it may be determined whether to perform luminance compensation on a block encoded as a preset encoding mode. Luminance compensation information indicating whether to perform luminance compensation determined on the block of the encoding mode may be included in a transmission stream or may be acquired from a received stream.

Therefore, the interlayer video encoding apparatus 10 and the interlayer video decoding apparatus 20 according to various embodiments may determine whether to perform luminance compensation only on a block that further relatively needs luminance compensation and may not perform luminance compensation on other blocks, thereby reducing operation load due to luminance compensation and improving encoding efficiency owing to luminance compensation.

In the interlayer video encoding apparatus 10 according to an embodiment and the interlayer video decoding apparatus 20 according to an embodiment, as described above, video data may be split into coding units having a tree structure, and coding units, prediction units, and transformation units are used for inter layer prediction or inter prediction on the coding units. Hereinafter, a video encoding method and apparatus and a video decoding method and apparatus based on coding units having a tree structure according to an embodiment will be described with reference to FIGS. 7 through 19.

In principle, during encoding/decoding for multi-layer video, encoding/decoding processes for first layer images and encoding/decoding processes for second layer images are separately performed. That is, when inter-layer prediction is performed on a multi-layer video, encoding/decoding results of a single-layer video are referred to each other, but separate encoding/decoding processes are performed for respective single-layer videos.

For convenience of description, since a video encoding process and a video decoding process based on a coding unit according to a tree structure, which will be described with reference to FIGS. 7 through 19, are performed on a single-layer video, only inter prediction and motion compensation will be described. However, as described with reference to FIGS. 1A through 6, inter-layer prediction and compensation between base layer images and second layer images are performed to encode/decode a video stream.

Figure 7:
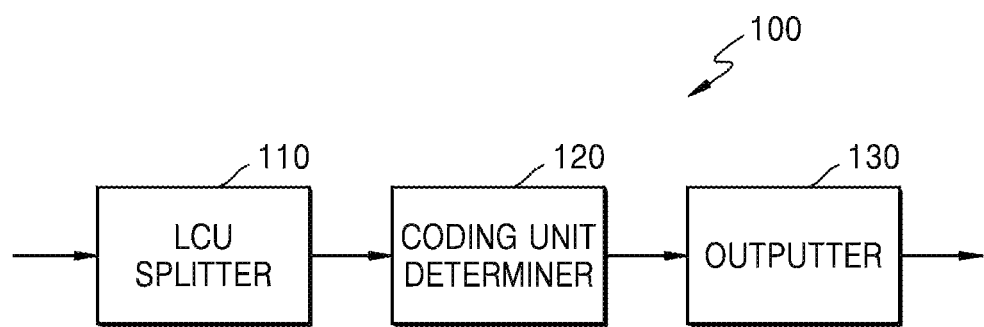
FIG. 7 is a block diagram of a video encoding apparatus based on coding units according to a tree structure, according to an embodiment.

Thus, when the first layer encoder 12 of the interlayer video encoding apparatus 10 according to an embodiment encodes a multi-layer video based on a coding unit according to a tree structure, in order to encode a video for each respective single-view video, the interlayer video encoding apparatus 10 includes as many video encoding apparatuses 100 of FIG. 7 as the number of layers of the multi-layer video in order to encode a video such that each video encoding apparatus 100 may be controlled to encode an assigned single-layer video. In addition, the interlayer video encoding apparatus 10 may perform inter-view prediction by using the encoding results of separate single-views of each video encoding apparatus 100. Thus, the first layer encoder 12 of the interlayer video encoding apparatus 10 may generate a base layer video stream and a second layer video stream, in which the encoding results for respective layers are recorded, for each respective hierarchy.

Figure 8:
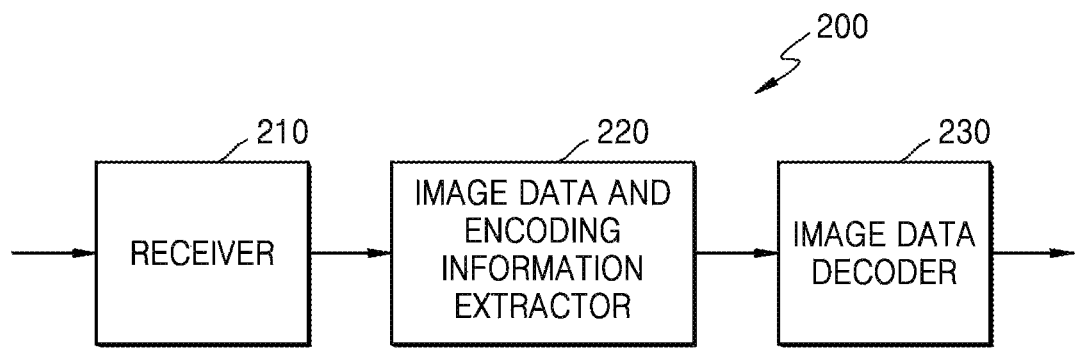
FIG. 8 is a block diagram of a video decoding apparatus based on coding units according to a tree structure, according to an embodiment.

Similarly, when the second layer encoder 26 of the interlayer video decoding apparatus 20 according to an embodiment decodes a multi-layer video based on a coding unit according to a tree structure, in order to decode the received base layer video stream and second layer video stream for each respective layer, the interlayer video decoding apparatus 20 may include as many video decoding apparatuses 200 of FIG. 8 as the number of layers of the multi-view video and the video decoding apparatuses 200 may be controlled to perform decoding on single-layer videos that are respectively assigned to the video decoding apparatuses 200. In addition, the interlayer video encoding apparatus 10 may perform inter-view compensation by using the decoding result of separate single-layer of each video decoding apparatuses 200. Thus, the second layer encoder 26 of the interlayer video decoding apparatus 20 may generate first layer images and second layer images, which are restored for respective layers.

FIG. 7 is a block diagram of the video encoding apparatus 100 based on coding units according to a tree structure, according to one or more embodiments.

The video encoding apparatus 100 involving video prediction based on coding units according to a tree structure includes a LCU splitter 110, a coding unit determiner 120, and an outputter 130.

The LCU splitter 110 may split a current picture based on a LCU that is a coding unit having a maximum size for a current picture of an image. If the current picture is larger than the LCU, image data of the current picture may be split into the at least one LCU. The LCU according to one or more embodiments may be a data unit having a size of 32×32, 64×64, 128×128, 256×256, etc., wherein a shape of the data unit is a square having a width and length in squares of 2. The image data may be output to the coding unit determiner 120 according to the at least one LCU.

A coding unit according to one or more embodiments may be characterized by a maximum size and a depth. The depth denotes the number of times the coding unit is spatially split from the LCU, and as the depth deepens, deeper coding units according to depths may be split from the LCU to a smallest coding unit (SCU). A depth of the LCU is an uppermost depth and a depth of the SCU is a lowermost depth. Since a size of a coding unit corresponding to each depth decreases as the depth of the LCU deepens, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to one or more embodiments is split according to depths, the image data of the space domain included in the LCU may be hierarchically classified according to depths.

A maximum depth and a maximum size of a coding unit, which limit the total number of times a height and a width of the LCU are hierarchically split, may be predetermined.

The coding unit determiner 120 encodes at least one split region obtained by splitting a region of the LCU according to depths, and determines a depth to output a finally encoded image data according to the at least one split region. In other words, the coding unit determiner 120 determines a depth by encoding the image data in the deeper coding units according to depths, according to the LCU of the current picture, and selecting a depth having the least encoding error. The determined depth and the encoded image data according to the determined depth are output to the outputter 130.

The image data in the LCU is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one depth may be selected for each LCU.

The size of the LCU is split as a coding unit is hierarchically split according to depths, and as the number of coding units increases. Also, even if coding units correspond to the same depth in one LCU, it is determined whether to split each of the coding units corresponding to the same depth to a lower depth by measuring an encoding error of the image data of the each coding unit, separately. Accordingly, even when image data is included in one LCU, the encoding errors may differ according to regions in the one LCU, and thus the depths may differ according to regions in the image data. Thus, one or more depths may be determined in one LCU, and the image data of the LCU may be divided according to coding units of at least one depth.

Accordingly, the coding unit determiner 120 may determine coding units having a tree structure included in the LCU. The 'coding units having a tree structure' according to one or more embodiments include coding units corresponding to a depth determined to be the depth, from among all deeper coding units included in the LCU. A coding unit of a depth may be hierarchically determined according to depths in the same region of the LCU, and may be independently determined in different regions. Similarly, a depth in a current region may be independently determined from a depth in another region.

A maximum depth according to one or more embodiments is an index related to the number of splitting times from a LCU to an SCU. A first maximum depth according to one or more embodiments may denote the total number of splitting times from the LCU to the SCU. A second maximum depth according to one or more embodiments may denote the total number of depth levels from the LCU to the SCU. For example, when a depth of the LCU is 0, a depth of a coding unit, in which the LCU is split once, may be set to 1, and a depth of a coding unit, in which the LCU is split twice, may be set to 2. Here, if the SCU is a coding unit in which the LCU is split four times, 5 depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, is performed on all of the deeper coding units generated as the depth deepens. For convenience of description, the prediction encoding and the transformation will now be described based on a coding unit of a current depth, in a LCU.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the LCU, the prediction encoding may be performed based on a coding unit corresponding to a depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residues in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a depth requires not only information about the depth, but also about information related to prediction encoding and transformation. Accordingly, the coding unit determiner 120 not only determines a depth having a least encoding error, but also determines a partition mode in a prediction unit, a prediction mode according to prediction units, and a size of a transformation unit for transformation.

Coding units according to a tree structure in a LCU and methods of determining a prediction unit/partition, and a transformation unit, according to one or more embodiments, will be described in detail below with reference to FIGS. 8 through 19.

The coding unit determiner 120 may measure an encoding error of deeper coding units according to depths by using Rate-Distortion Optimization based on Lagrangian multipliers.

The outputter 130 outputs the image data of the LCU, which is encoded based on the at least one depth determined by the coding unit determiner 120, and information about the encoding mode according to the depth, in bitstreams.

The encoded image data may be obtained by encoding residues of an image.

The information about the encoding mode according to depth may include information about the depth, about the partition mode in the prediction unit, the prediction mode, and the size of the transformation unit.

The information about the depth may be defined by using splitting information according to depths, which indicates whether encoding is performed on coding units of a lower depth instead of a current depth. If the current depth of the current coding unit is the depth, image data in the current coding unit is encoded and output, and thus the splitting information may be defined not to split the current coding unit to a lower depth. Alternatively, if the current depth of the current coding unit is not the depth, the encoding is performed on the coding unit of the lower depth, and thus the splitting information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one LCU, and information about at least one encoding mode is determined for a coding unit of a depth, information about at least one encoding mode may be determined for one LCU. Also, a depth of the image data of the LCU may be different according to locations since the image data is hierarchically split according to depths, and thus splitting information may be set for the image data.

Accordingly, the outputter 130 may assign corresponding splitting information to at least one of the coding unit, the prediction unit, and a minimum unit included in the LCU.

The minimum unit according to one or more embodiments is a square data unit obtained by splitting the SCU constituting the lowermost depth by 4. Alternatively, the minimum unit according to an embodiment may be a maximum square data unit that may be included in all of the coding units, prediction units, partition units, and transformation units included in the LCU.

For example, the encoding information output by the outputter 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The outputter 130 may encode and output SAO parameters related to the SAO operation described above with reference to FIGS. 1A through 14.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each LCU, based on the size of the LCU and the maximum depth determined considering characteristics of the current picture. Also, since encoding may be performed on each LCU by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The interlayer video encoding apparatus 10 described with reference to FIG. 1A may include as many video encoding apparatuses 100 as the number of layers in order to encode single-layer images for respective layers of a multi-layer video. For example, the first layer encoder 12 may include a single video encoding apparatus 100 and the disparity vector determiner 14 may include as many video encoding apparatuses 100 as the number of additional views.

When the video encoding apparatus 100 encodes first layer images, the coding determiner 120 may determine a prediction unit for inter prediction for each respective coding unit according to a tree structure for each largest coding unit and may perform inter prediction for each respective prediction unit.

When the video encoding apparatus 100 encodes second layer images, the coding determiner 120 may also determine a prediction unit and a coding unit according to a tree structure for each largest coding unit and may perform inter prediction for each respective prediction unit.

The video encoding apparatus 100 may encode a brightness difference between first and second layer images for compensating for the brightness difference. However, whether to perform brightness compensation may be determined according to an encoding mode of a coding unit. For example, the brightness compensation may be performed only on a prediction unit of 2N×2N.

FIG. 8 is a block diagram of the video decoding apparatus 200 based on coding units having a tree structure, according to one or more embodiments.

The video decoding apparatus 200 that involves video prediction based on coding units having a tree structure includes a receiver 210, an image data and encoding information extractor 220, and an image data decoder 230.

Definitions of various terms, such as a coding unit, a depth, a prediction unit, a transformation unit, and information about various encoding modes, for decoding operations of the video decoding apparatus 200 are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LCU, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts splitting information and encoding information for the coding units having a tree structure according to each LCU, from the parsed bitstream. The extracted splitting information and encoding information are output to the image data decoder 230. In other words, the image data in a bit stream is split into the LCU so that the image data decoder 230 decodes the image data for each LCU.

The splitting information and encoding information according to the LCU may be set for at least one piece of splitting information corresponding to the depth, and encoding information according to the depth may include information about a partition mode of a corresponding coding unit corresponding to the depth, information about a prediction mode, and splitting information of a transformation unit. Also, splitting information according to depths may be extracted as the information about a final depth.

The splitting information and the encoding information according to each LCU extracted by the image data and encoding information extractor 220 is splitting information and encoding information determined to generate a minimum encoding error when an encoder, such as the video encoding apparatus 100, repeatedly performs encoding for each deeper coding unit according to depths according to each LCU. Accordingly, the video decoding apparatus 200 may reconstruct an image by decoding the image data according to a depth and an encoding mode that generates the minimum encoding error.

Since the splitting information and the encoding information may be assigned to a predetermined data unit from among a corresponding coding unit, a prediction unit, and a minimum unit, the image data and encoding information extractor 220 may extract the splitting information and the encoding information according to the predetermined data units. If splitting information and encoding information of a corresponding LCU are recorded according to predetermined data units, the predetermined data units to which the same splitting information and encoding information are assigned may be inferred to be the data units included in the same LCU.

The image data decoder 230 reconstructs the current picture by decoding the image data in each LCU based on the splitting information and the encoding information according to the LCUs. In other words, the image data decoder 230 may decode the encoded image data based on the extracted information about the partition mode, the prediction mode, and the transformation unit for each coding unit from among the coding units having the tree structure included in each LCU. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each LCU. Via the inverse transformation, a pixel value of the space domain of the coding unit may be reconstructed.

The image data decoder 230 may determine a final depth of a current LCU by using splitting information according to depths. If the splitting information indicates that image data is no longer split in the current depth, the current depth is the final depth. Accordingly, the image data decoder 230 may decode encoded data in the current LCU by using the information about the partition mode of the prediction unit, the information about the prediction mode, and the splitting information of the transformation unit for each coding unit corresponding to the depth.

In other words, data units containing the encoding information including the same splitting information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The interlayer video decoding apparatus 20 described with reference to FIG. 2A may include as many video decoding apparatuses 200 as the number of views in order to decode the received first layer image stream and second layer image stream to restore first layer images and second layer images.

When a first layer image stream is received, the image data decoder 230 of the video decoding apparatus 200 may split samples of first layer images that are extracted from the first layer image stream by the extractor 220 into coding units according to a tree structure of a largest coding unit. The image data decoder 230 may perform motion compensation on respective prediction units for inter prediction for each respective coding unit according to a tree structure of the samples of the first layer images, to restore the first layer images.

When a second layer image stream is received, the image data decoder 230 of the video decoding apparatus 200 may split samples of second layer images that are extracted from the second layer image stream by the extractor 220 into coding units according to a tree structure of a largest coding unit. The image data decoder 230 may perform motion compensation on respective prediction units for inter prediction of the samples of the second layer images to restore the second layer images.

The extractor 220 may obtain information relating to a brightness order between first and second layer images from a bitstream in order to compensate for the brightness difference. However, whether to perform brightness compensation may be determined according to an encoding mode of a coding unit. For example, the brightness compensation may be performed only on a prediction unit of 2N×2N.

The video decoding apparatus 200 may obtain information about at least one coding unit that generates the minimum encoding error when encoding is recursively performed for each largest coding unit, and may use the information to decode the current picture. In other words, the coding units having the tree structure determined to be the optimum coding units in each largest coding unit may be decoded. Also, the maximum size of a coding unit is determined considering a resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 9:
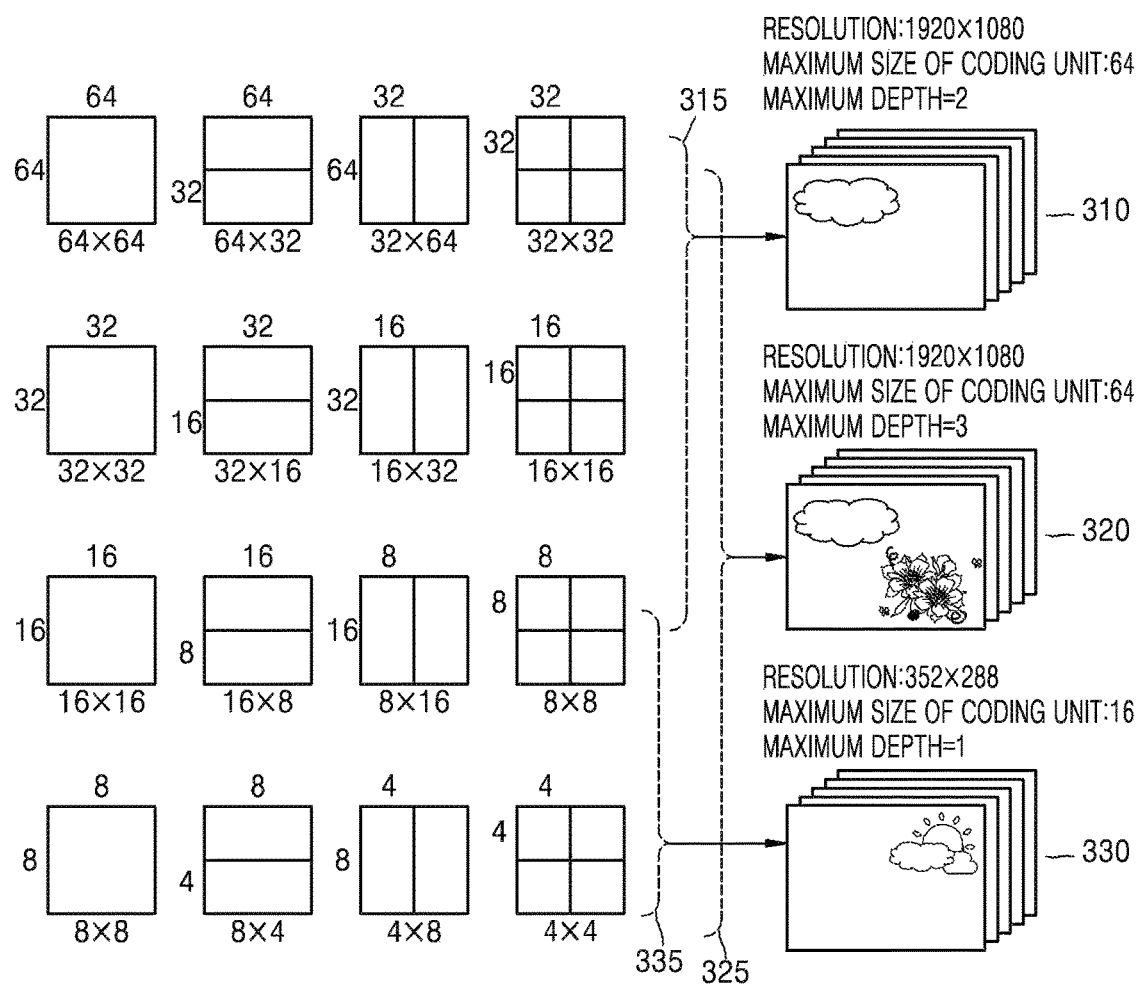
FIG. 9 is a diagram for describing a concept of coding units according to an embodiment.

FIG. 9 is a diagram for describing a concept of coding units according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 9 denotes a total number of splits from a LCU to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a LCU having a long axis size of 64, and coding units having long axis sizes of 32 and 16 since depths are deepened to two layers by splitting the LCU twice. Since the maximum depth of the video data 330 is 1, coding units 335 of the video data 330 may include a LCU having a long axis size of 16, and coding units having a long axis size of 8 since depths are deepened to one layer by splitting the LCU once.

Since the maximum depth of the video data 320 is 3, coding units 325 of the video data 320 may include a LCU having a long axis size of 64, and coding units having long axis sizes of 32, 16, and 8 since the depths are deepened to 3 layers by splitting the LCU three times. As a depth deepens, detailed information may be precisely expressed.

Figure 10:
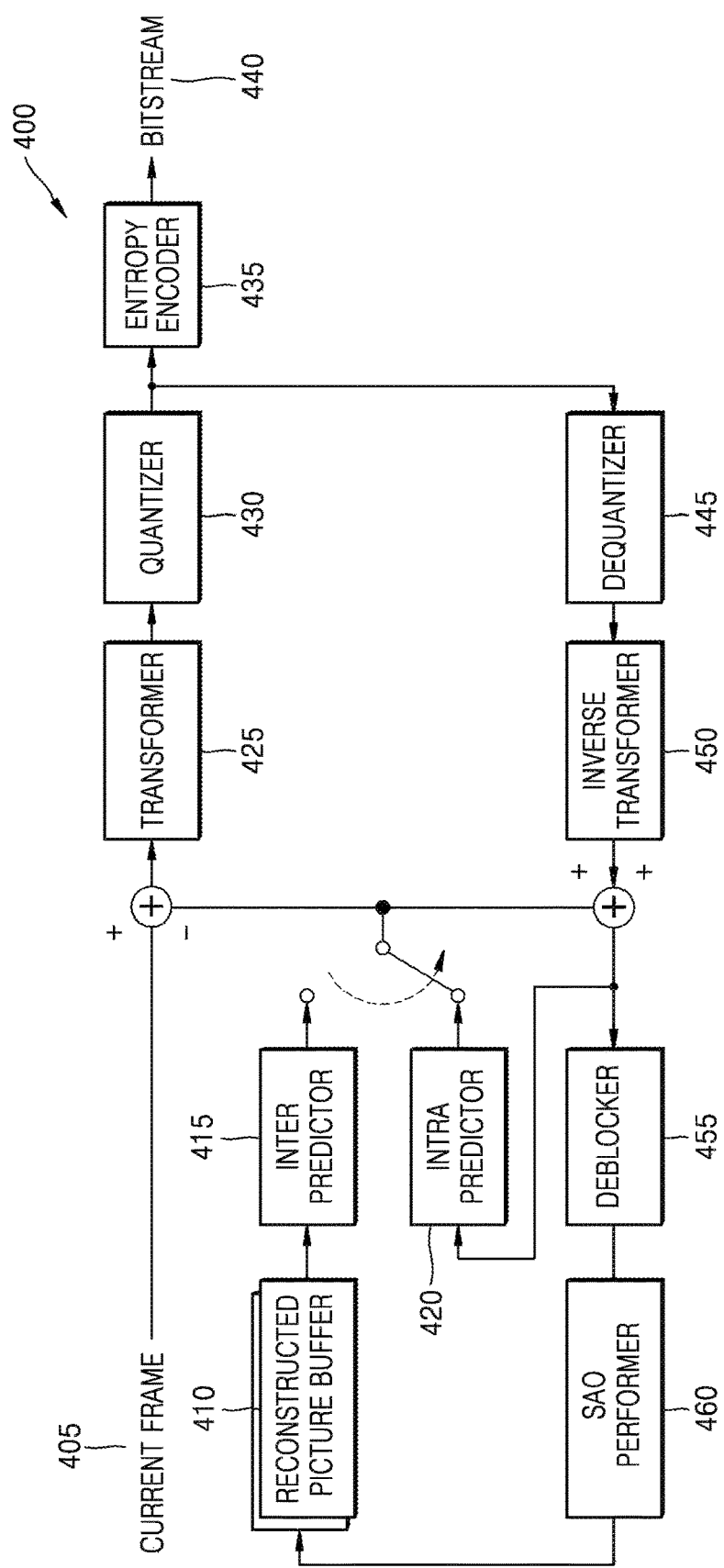
FIG. 10 is a block diagram of an image encoder based on coding units, according to an embodiment.

FIG. 10 is a block diagram of an image encoder 400 based on coding units, according to one or more embodiments.

The image encoder 400 performs operations necessary for encoding image data in the coding unit determiner 120 of the video encoding apparatus 100. In other words, an intra predictor 420 performs intra prediction on coding units in an intra mode according to prediction units, from among a current frame 405, and an inter predictor 415 performs inter prediction on coding units in an inter mode by using a current image 405 and a reference image obtained from a reconstructed picture buffer 410 according to prediction units. The current image 405 may be split into LCUs and then the LCUs may be sequentially encoded. In this regard, the LCUs that are to be split into coding units having a tree structure may be encoded.

Residue data is generated by removing prediction data regarding coding units of each mode that is output from the intra predictor 420 or the inter predictor 415 from data regarding encoded coding units of the current image 405, and is output as a quantized transformation coefficient according to transformation units through a transformer 425 and a quantizer 430. The quantized transformation coefficient is reconstructed as the residue data in a space domain through a dequantizer 445 and an inverse transformer 450. The reconstructed residue data in the space domain is added to prediction data for coding units of each mode that is output from the intra predictor 420 or the inter predictor and thus is reconstructed as data in a space domain for coding units of the current image 405. The reconstructed data in the space domain is generated as reconstructed images through a de-blocker 455 and an SAO performer 460 and the reconstructed images are stored in the reconstructed picture buffer 410. The reconstructed images stored in the reconstructed picture buffer 410 may be used as reference images for inter prediction of another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the dequantizer 445, the inverse transformer 450, the de-blocker 455, and the SAO performer 460, perform operations based on each coding unit among coding units having a tree structure according to each LCU.

In particular, the intra predictor 410, the motion estimator 420, and the motion compensator 425 determines partitions and a prediction mode of each coding unit from among the coding units having a tree structure while considering the maximum size and the maximum depth of a current LCU, and the transformer 430 determines the size of the transformation unit in each coding unit from among the coding units having a tree structure.

Specifically, the intra predictor 420 and the inter predictor 415 may determine a partition mode and a prediction mode of each coding unit among the coding units having a tree structure in consideration of a maximum size and a maximum depth of a current LCU, and the transformer 425 may determine whether to split a transformation unit having a quad tree structure in each coding unit among the coding units having a tree structure.

Figure 11:
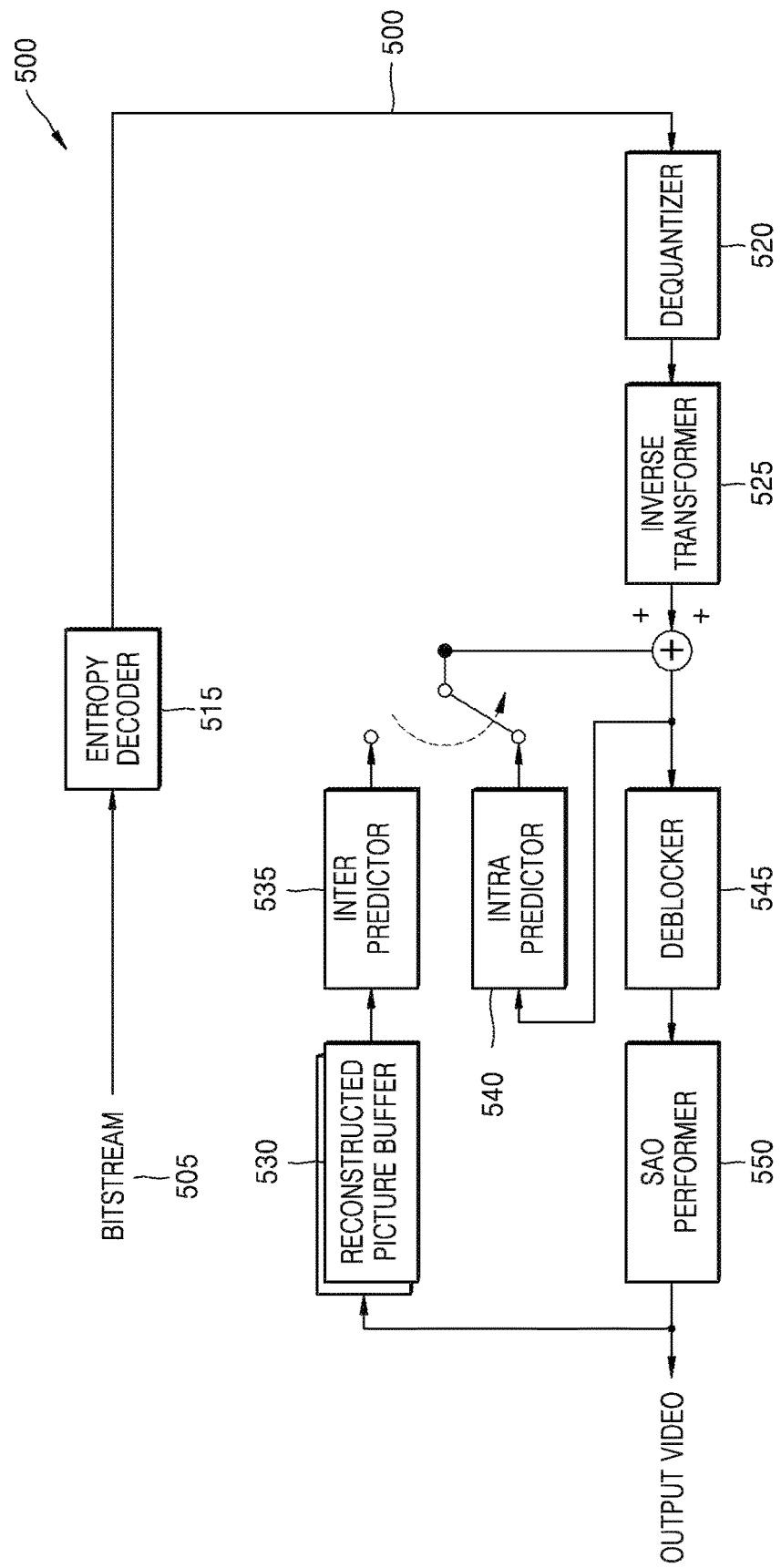
FIG. 11 is a block diagram of an image decoder based on coding units, according to an embodiment.

FIG. 11 is a block diagram of an image decoder 500 based on coding units, according to one or more embodiments.

An entropy decoder 515 parses encoded image data to be decoded and information about encoding required for decoding from a bitstream 505. The encoded image data is a quantized transformation coefficient from which residue data is reconstructed by a dequantizer 520 and an inverse transformer 525.

An intra predictor 540 performs intra prediction on coding units in an intra mode according to each prediction unit. An inter predictor 535 performs inter prediction on coding units in an inter mode from among the current image 405 for each prediction unit by using a reference image obtained from a reconstructed picture buffer 530.

Prediction data and residue data regarding coding units of each mode, which passed through the intra predictor 540 and the inter predictor 535, are summed, and thus data in a space domain regarding coding units of the current image 405 may be reconstructed, and the reconstructed data in the space domain may be output as a reconstructed image 560 through a de-blocker 545 and an SAO performer 550. Reconstructed images stored in the reconstructed picture buffer 530 may be output as reference images.

In order to decode the image data in the image data decoder 230 of the video decoding apparatus 200, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the dequantizer 520, the inverse transformer 525, the inter predictor 535, the de-blocker 545, and the SAO performer 550 may perform operations based on coding units having a tree structure for each LCU.

In particular, the SAO performer 550 and the inter predictor 535 may determine a partition and a prediction mode for each of the coding units having a tree structure, and the inverse transformer 525 may determine whether to split a transformation unit having a quad tree structure for each of the coding units.

Figure 12:
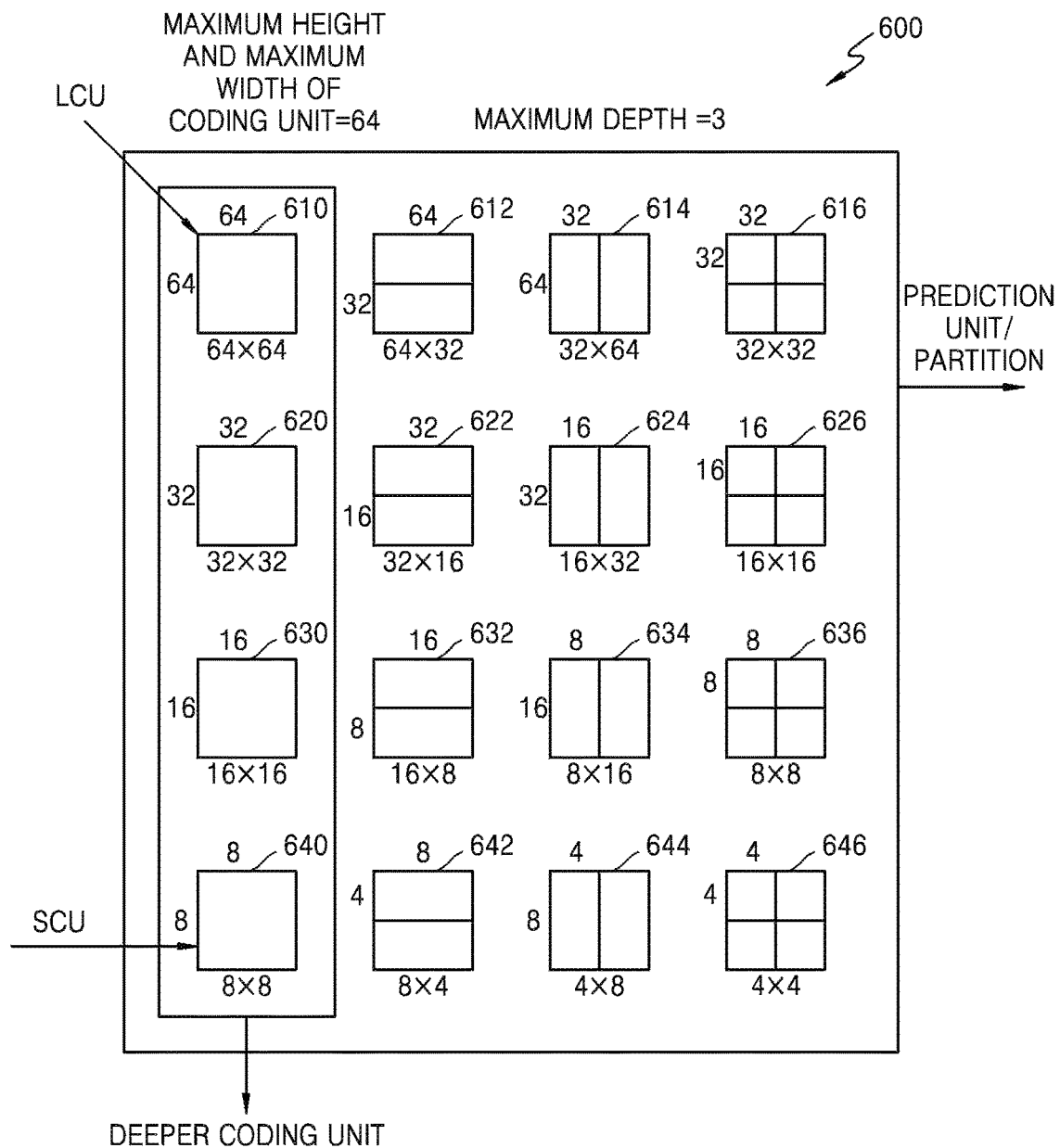
FIG. 12 is a diagram illustrating deeper coding units and partitions, according to an embodiment.

The encoding operation of FIG. 10 and the encoding operation of FIG. 11 describe video stream encoding and decoding operations in a single layer, respectively. Thus, if the first layer encoder 12 of FIG. 1A encodes video streams of two or more layers, the image encoder 400 may be provided for each layer. Similarly, if the second layer decoder 26 of FIG. 2A decodes video streams of two or more layers, the image decoder 500 may be provided for each layer FIG. 12 is a diagram illustrating deeper coding units according to depths, and partitions, according to one or more embodiments.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to one or more embodiments, the maximum height and the maximum width of the coding units are each 64, and the maximum depth is 3. In this case, the maximum depth refers to a total number of times the coding unit is split from the LCU to the SCU. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a LCU in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is an SCU.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine a final depth of the coding units constituting the LCU 610, the coding unit determiner 120 of the video encoding apparatus 100 performs encoding for coding units corresponding to each depth included in the LCU 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the final depth and a partition mode of the coding unit 610.

FIG. 13 is a diagram for describing a relationship between a coding unit 710 and transformation units 720, according to one or more embodiments.

The video encoding apparatus 100 or the video decoding apparatus 200 encodes or decodes an image according to coding units having sizes smaller than or equal to a LCU for each LCU. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 14 is a diagram fro describing encoding information of coding units corresponding to a depth, according to one or more embodiments.

The outputter 130 of the video encoding apparatus 100 may encode and transmit information 800 about a partition mode, information 810 about a prediction mode, and information 820 about a size of a transformation unit for each coding unit corresponding to a final depth, as information about an encoding mode.

The information 800 indicates information about a mode of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition mode is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 15:
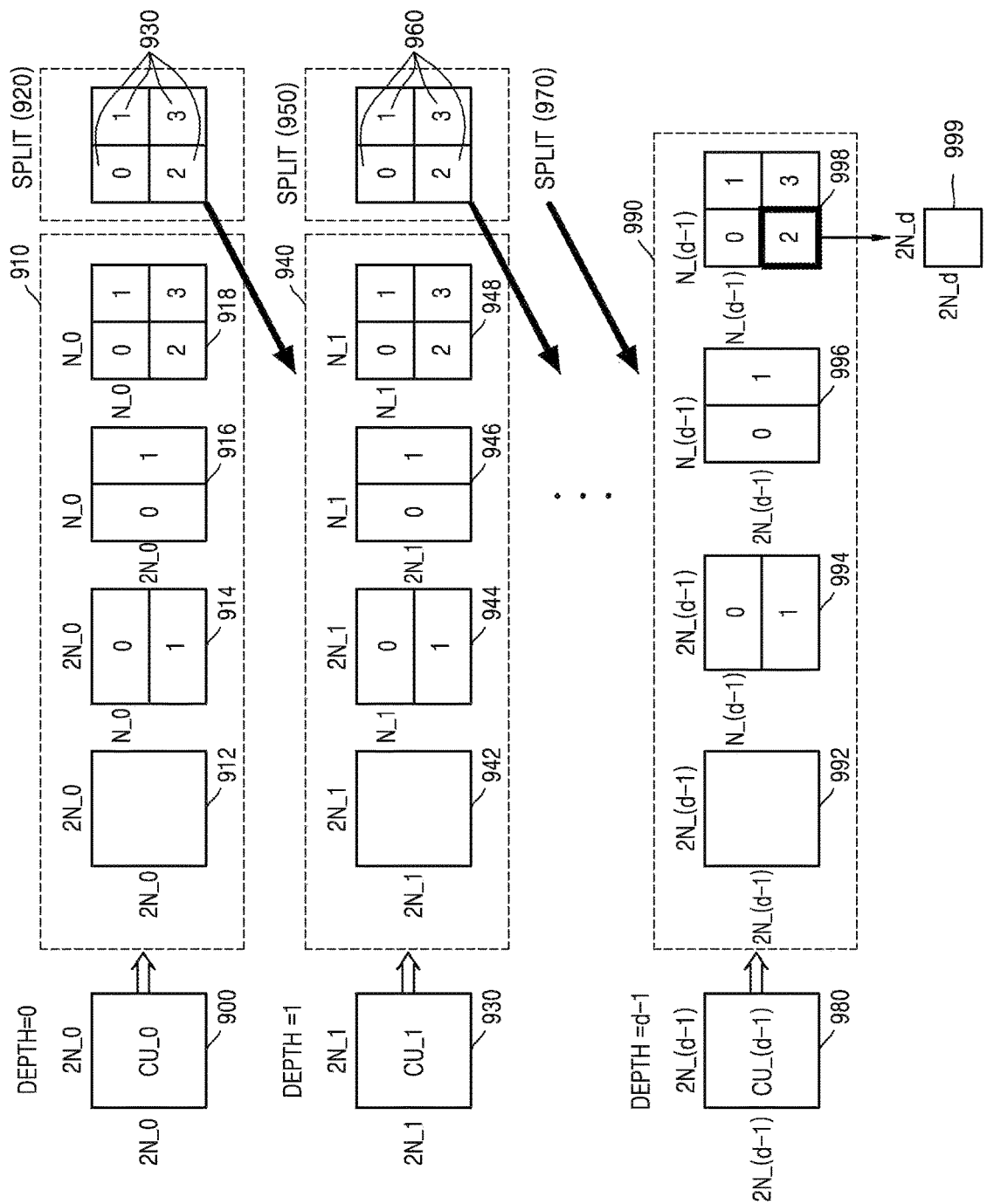
FIG. 15 is a diagram of deeper coding units, according to an embodiment.

FIG. 15 is a diagram of deeper coding units according to depths, according to one or more embodiments.

Splitting information may be used to indicate a change of a depth. The spilt information indicates whether a coding unit of a current depth is split into coding units of a lower depth.

Figure 23:
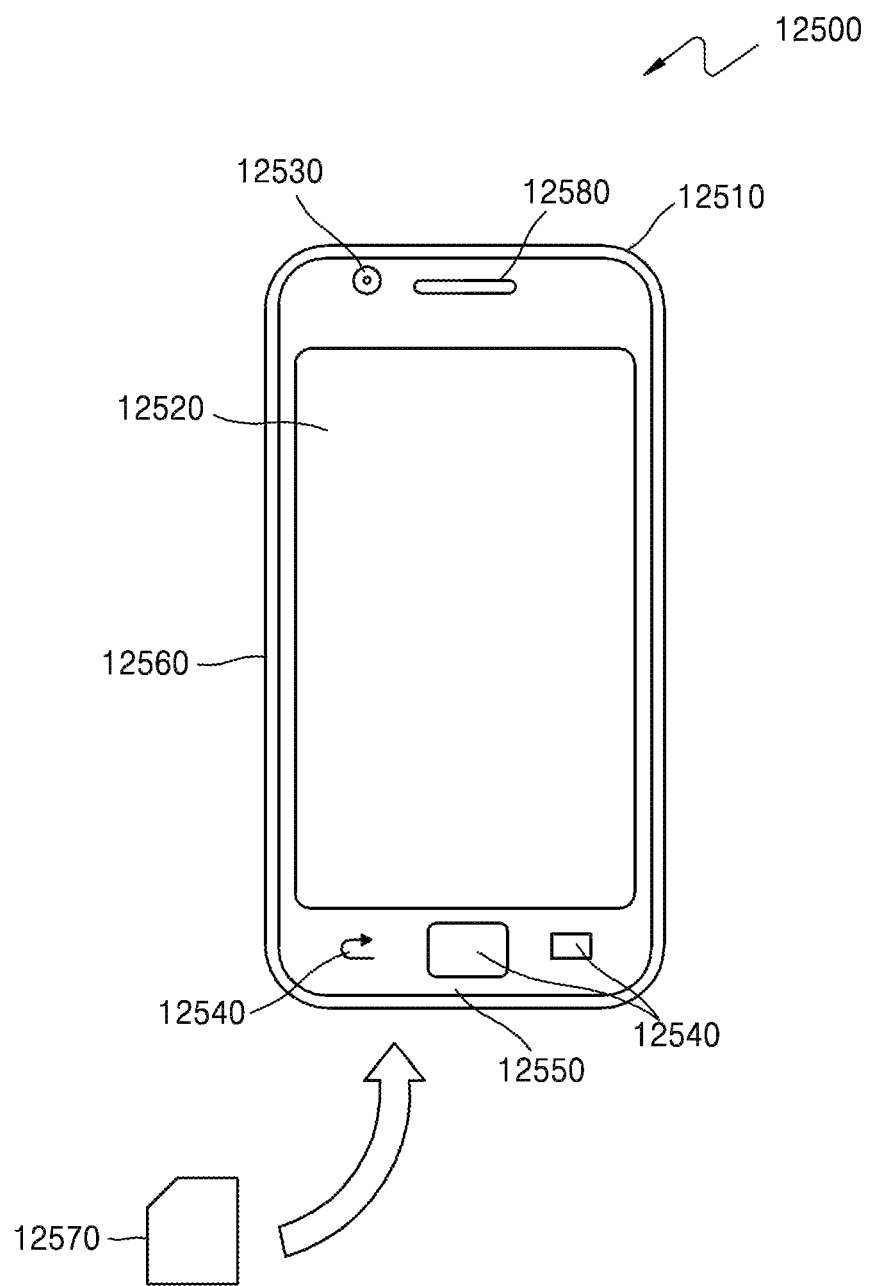
FIGS. 23 and 24 are diagrams respectively of an external structure and an internal structure of a mobile phone to which a video encoding method and a video decoding method are applied, according to an embodiment.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. FIG. 23 only illustrates the partition modes 912 through 918 which are obtained by symmetrically splitting the prediction unit 910, but a partition mode is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 912 through 916, the prediction unit 910 may not be split into a lower depth.

If the encoding error is the smallest in the partition mode 918, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d-1, and splitting information may be encoded as up to when a depth is one of 0 to d-2. In other words, when encoding is performed up to when the depth is d-1 after a coding unit corresponding to a depth of d-2 is split in operation 970, a prediction unit 990 for prediction encoding a coding unit 980 having a depth of d-1 and a size of 2N_(d-1)×2N_(d-1) may include partitions of a partition mode 992 having a size of 2N_(d-1)×2N_(d-1), a partition mode 994 having a size of 2N_(d-1)×N_(d-1), a partition mode 996 having a size of N_(d-1)×2N_(d-1), and a partition mode 998 having a size of N_(d-1)×N_(d-1).

Prediction encoding may be repeatedly performed on one partition having a size of 2N_(d-1)×2N_(d-1), two partitions having a size of 2N_(d-1)×N_(d-1), two partitions having a size of N_(d-1)×2N_(d-1), four partitions having a size of N_(d-1)×N_(d-1) from among the partition modes 992 through 998 to search for a partition mode having a minimum encoding error.

Even when the partition mode 998 has the minimum encoding error, since a maximum depth is d, a coding unit CU_(d-1) having a depth of d-1 is no longer split to a lower depth, and a depth for the coding units constituting a current LCU 900 is determined to be d-1 and a partition mode of the current LCU 900 may be determined to be N_(d-1)×N_(d-1). Also, since the maximum depth is d and an SCU 980 having a lowermost depth of d-1 is no longer split to a lower depth, splitting information for the SCU 980 is not set.

A data unit 999 may be a 'minimum unit' for the current LCU. A minimum unit according to one or more embodiments may be a square data unit obtained by splitting an SCU 980 by 4. By performing the encoding repeatedly, the video encoding apparatus 100 may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 1 through d, and a depth having the least encoding error may be determined as a depth. The depth, the partition mode of the prediction unit, and the prediction mode may be encoded and transmitted as information about an encoding mode. Also, since a coding unit is split from a depth of 0 to a depth, only splitting information of the depth is set to 0, and splitting information of depths excluding the depth is set to 1.

The image data and encoding information extractor 220 of the video decoding apparatus 200 may extract and use the information about the depth and the prediction unit of the coding unit 900 to decode the partition 912. The video decoding apparatus 200 may determine a depth, in which splitting information is 0, as a depth by using splitting information according to depths, and use information about an encoding mode of the corresponding depth for decoding.

Figure 16:
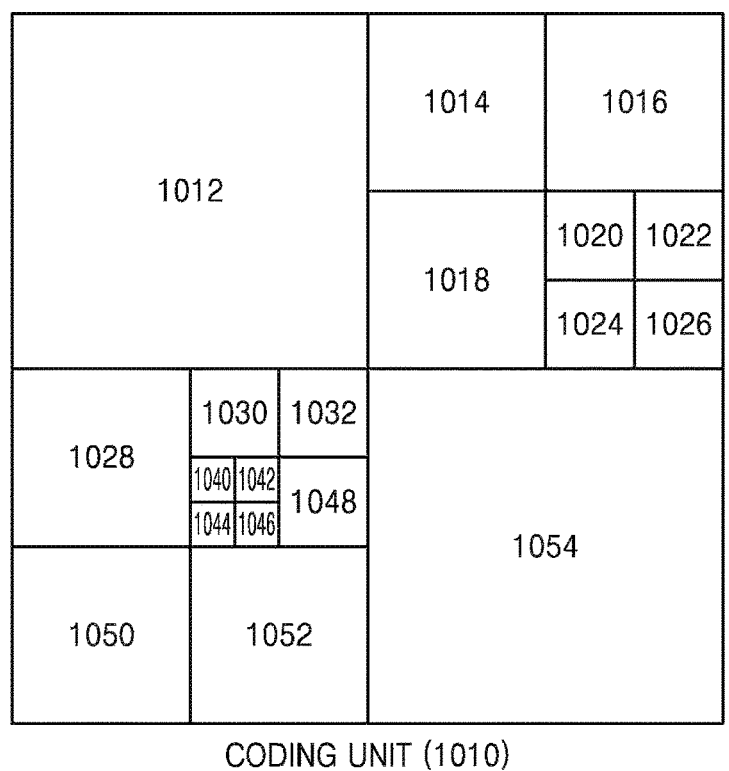
FIGS. 16 through 18 are diagrams for describing a relationship between coding units, prediction units, and transformation units, according to an embodiment.
Figure 17:
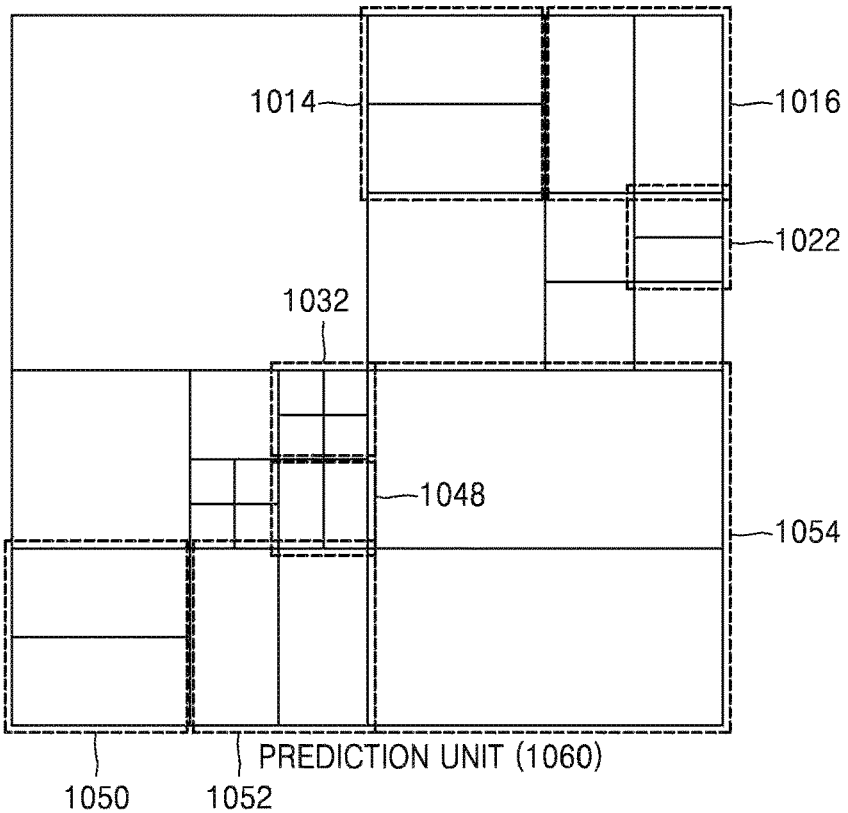
Figure 18:
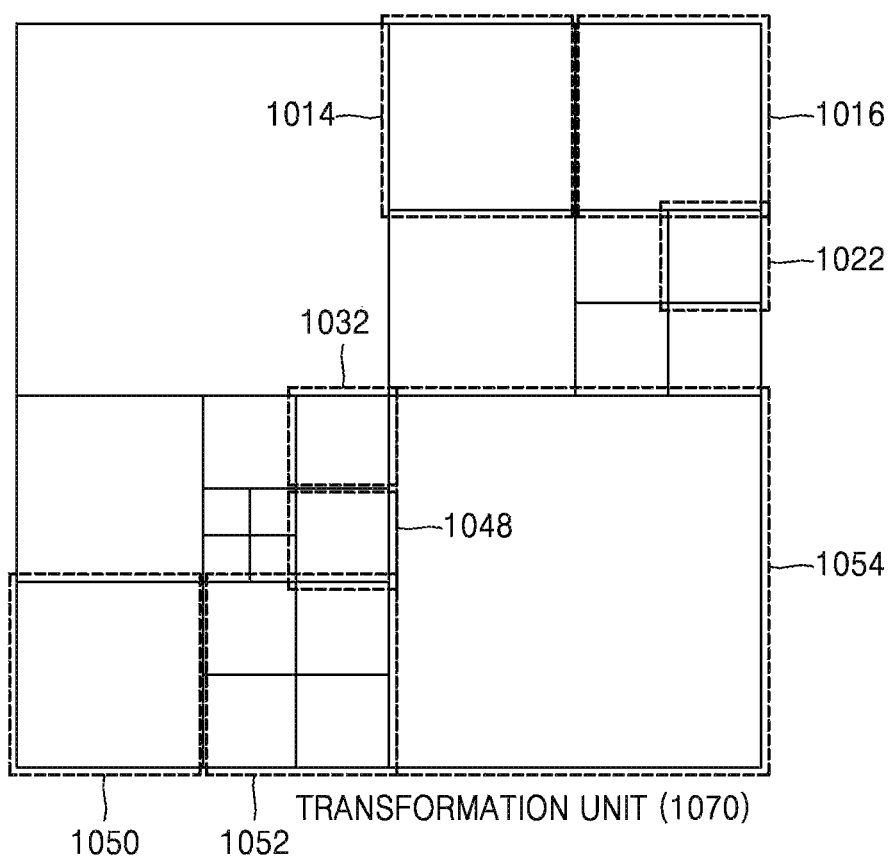

FIGS. 16 through 18 are diagrams for describing a relationship between coding units 1010, prediction units 1060, and transformation units 1070, according to one or more embodiments.

The coding units 1010 are coding units having a tree structure, corresponding to depths determined by the video encoding apparatus 100, in a LCU. The prediction units 1060 are partitions of prediction units of each of the coding units 1010, and the transformation units 1070 are transformation units of each of the coding units 1010.

When a depth of a LCU is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition modes in the coding units 1014, 1022, 1050, and 1054 have a size of 2N×N, partition modes in the coding units 1016, 1048, and 1052 have a size of N×2N, and a partition mode of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a LCU to determine an optimum coding unit, and thus coding units having a recursive tree structure may be obtained. Encoding information may include splitting information about a coding unit, information about a partition mode, information about a prediction mode, and information about a size of a transformation unit. Table 1 shows the encoding information that may be set by the video encoding and decoding apparatuses 100 and 200.

TABLE 1

Splitting information 0
(Encoding on Coding Unit having Size of 2N × 2N and Current Depth of d)

| Prediction Mode | Partition mode | | Size of Transformation Unit | | Splitting information 1 |
| --- | --- | --- | --- | --- | --- |
| | Symmetrical Partition mode | Asymmetrical Partition mode | Splitting information 0 of Transformation Unit | Splitting information 1 of Transformation Unit | |
| Intra Inter | 2N × 2N 2N × N | 2N × nU 2N × nD | 2N × 2N | N × N (Symmetrical | Repeatedly Encode |

TABLE 1-continued

Splitting information 0
(Encoding on Coding Unit having Size of 2N × 2N and Current Depth of d)

| | Partition mode | | Size of Transformation Unit | | |
|---|---|---|---|---|---|
| Prediction Mode | Symmetrical Partition mode | Asymmetrical Partition mode | Splitting information 0 of Transformation Unit | Splitting information 1 of Transformation Unit | Splitting information 1 |
| Skip (Only 2N × 2N) | N × 2N<br>N × N | nL × 2N<br>nR × 2N | | Type)<br>N/2 × N/2<br>(Asymmetrical Type) | Coding Units having Lower Depth of d + 1 |

The outputter 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Splitting information indicates whether a current coding unit is split into coding units of a lower depth. If splitting information of a current depth d is 0, a depth, in which a current coding unit is no longer split into a lower depth, is a final depth, and thus information about a partition mode, prediction mode, and a size of a transformation unit may be defined for the final depth. If the current coding unit is further split according to the splitting information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1

The size of the transformation unit may be set to be two types in the intra mode and two types in the inter mode. In other words, if splitting information of the transformation unit is 0, the size of the transformation unit may be 2N×2N, which is the size of the current coding unit. If splitting information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure may include at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a LCU may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 19:
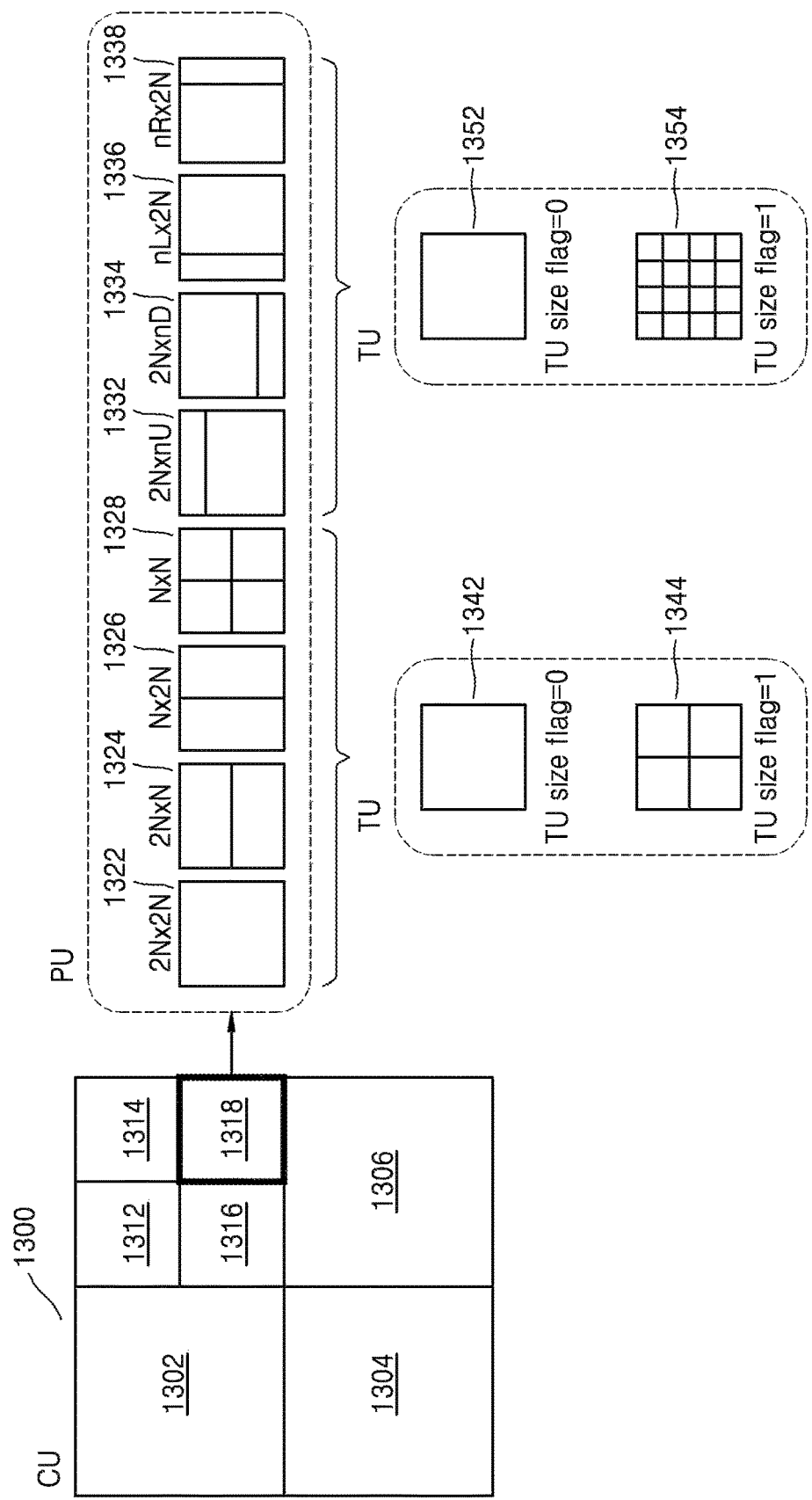
FIG. 19 is a diagram for describing a relationship between a coding unit, a prediction unit, and a transformation unit, according to encoding mode information of Table 1.

FIG. 19 is a diagram for describing a relationship between a coding unit, a prediction unit, and a transformation unit, according to encoding mode information of Table 1.

A LCU 1300 includes coding units 1302, 1304, 1306, 1312, 1314, 1316, and 1318 of depths. Here, since the coding unit 1318 is a coding unit of a depth, splitting information may be set to 0. Information about a partition mode of the coding unit 1318 having a size of 2N×2N may be set to be one of a partition mode 1322 having a size of 2N×2N, a partition mode 1324 having a size of 2N×N, a partition mode 1326 having a size of N×2N, a partition mode 1328 having a size of N×N, a partition mode 1332 having a size of 2N×nU, a partition mode 1334 having a size of 2N×nD, a partition mode 1336 having a size of nL×2N, and a partition mode 1338 having a size of nR×2N.

Splitting information (TU size flag) of a transformation unit is a type of a transformation index. The size of the transformation unit corresponding to the transformation index may be changed according to a prediction unit type or partition mode of the coding unit.

For example, when the partition mode is set to be symmetrical, i.e. the partition mode 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition mode is set to be asymmetrical, i.e., the partition mode 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value or 0 or 1, but the TU size flag is not limited to 1 bit, and a transformation unit may be hierarchically split having a tree structure while the TU size flag increases from 0. Splitting information (TU size flag) of a transformation unit may be an example of a transformation index.

In this case, the size of a transformation unit that has been actually used may be expressed by using a TU size flag of a transformation unit, according to one or more embodiments, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to one or more embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the embodiments are not limited thereto.

According to the video encoding method based on coding units having a tree structure as described with reference to FIGS. 7 through 19, image data of the space domain is encoded for each coding unit of a tree structure. According to the video decoding method based on coding units having a tree structure, decoding is performed for each LCU to reconstruct image data of the space domain. Thus, a picture and a video that is a picture sequence may be reconstructed. The reconstructed video may be reproduced by a reproducing apparatus, stored in a storage medium, or transmitted through a network.

The embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the inter layer video encoding method and/or the video encoding method described above with reference to FIGS. 1A through 19, will be referred to as a 'video encoding method according to the various embodiments'. In addition, the inter layer video decoding method and/or the video decoding method described above with reference to FIGS. 1A through 19, will be referred to as a 'video decoding method according to the various embodiments'.

A video encoding apparatus including the inter layer video encoding apparatus 10, the video encoding apparatus 100, or the image encoder 400, which is described above with reference to FIGS. 1A through 19, will be referred to as a 'video encoding apparatus according to the various embodiments'. In addition, a video decoding apparatus including the inter layer video decoding apparatus 20, the video decoding apparatus 200, or the image decoder 500, which is described above with reference to FIGS. 1A through 19, will be referred to as a 'video decoding apparatus according to the various embodiments'.

A computer-readable recording medium storing a program, e.g., a disc 26000, according to various embodiments will now be described in detail.

Figure 20:
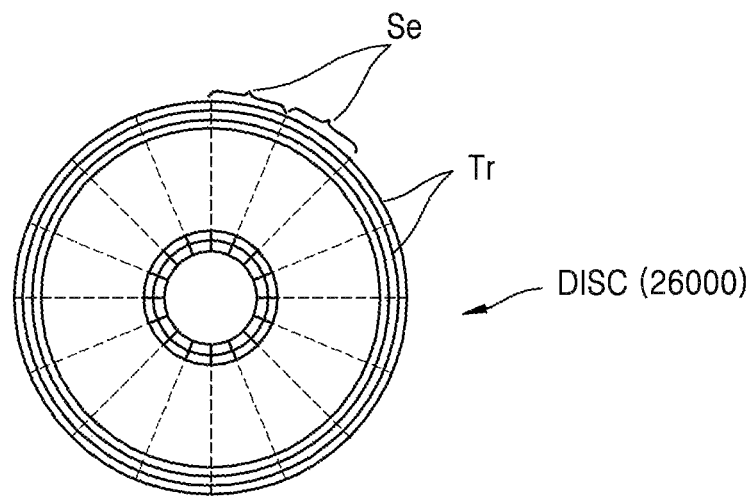
FIG. 20 is a diagram of a physical structure of a disc in which a program is stored, according to an embodiment.

FIG. 20 is a diagram of a physical structure of the disc 26000 in which a program is stored, according to one or more embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determination method, the video encoding method, and the video decoding method described above may be assigned and stored.

A computer system embodied using a storage medium that stores a program for executing the video encoding method and the video decoding method as described above will now be described with reference to FIG. 22.

Figure 21:
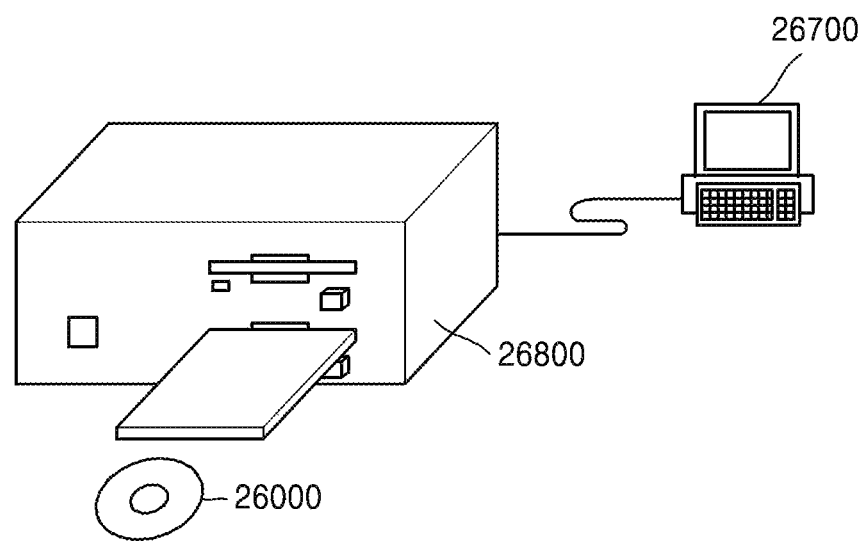
FIG. 21 is a diagram of a disc drive for recording and reading a program by using a disc.

FIG. 21 is a diagram of a disc drive 26800 for recording and reading a program by using the disc 26000. A computer system 26700 may store a program that executes at least one of a video encoding method and a video decoding method according to one or more embodiments, in the disc 26000 via the disc drive 26800. To run the program stored in the disc 26000 in the computer system 26700, the program may be read from the disc 26000 and be transmitted to the computer system 26700 by using the disc drive 26700.

The program that executes at least one of a video encoding method and a video decoding method according to one or more embodiments may be stored not only in the disc 26000 illustrated in FIG. 20 or 21 but also in a memory card, a ROM cassette, or a solid state drive (SSD).

A system to which the video encoding method and a video decoding method described above are applied will be described below.

Figure 22:
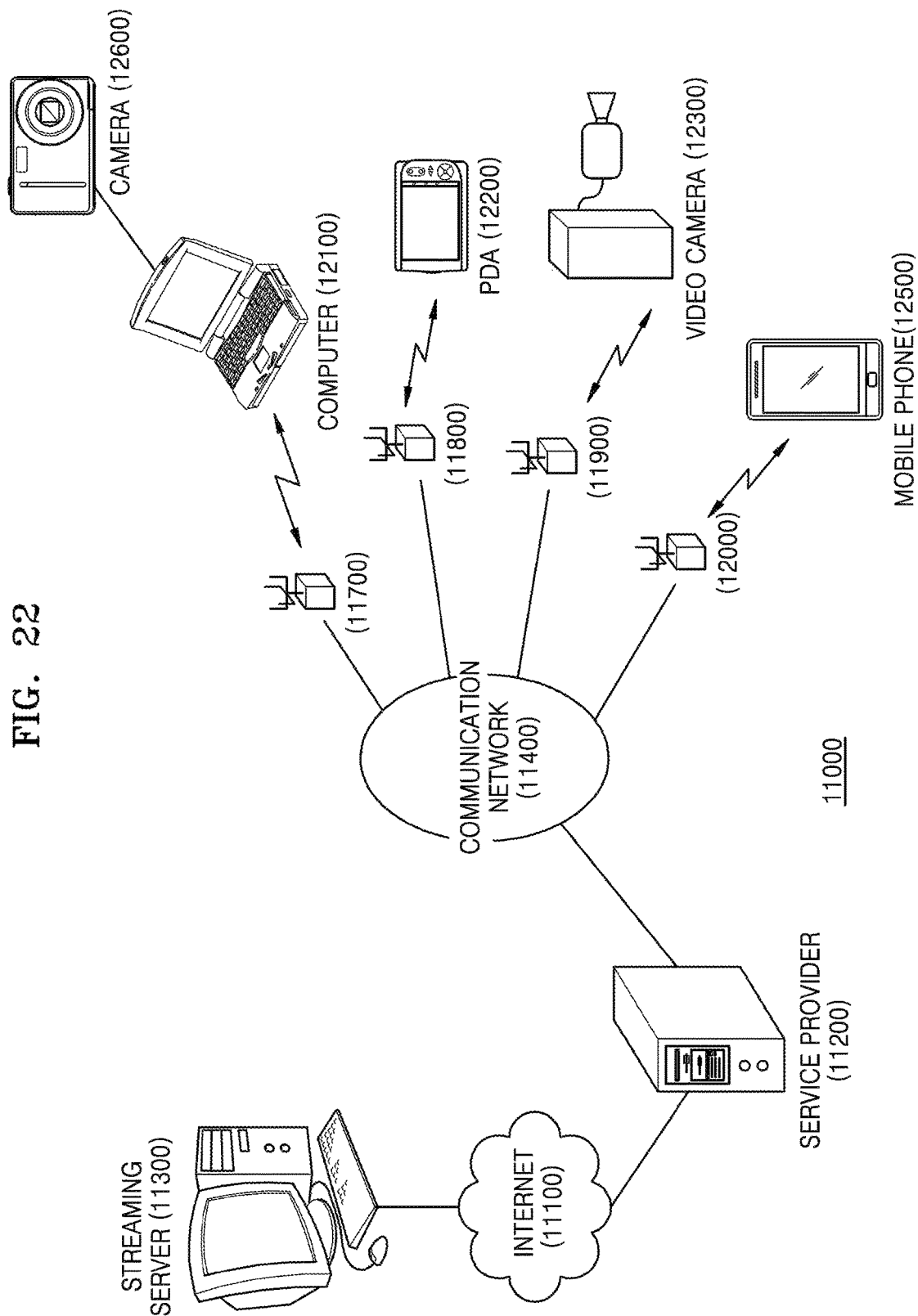
FIG. 22 is a diagram of an overall structure of a content supply system for providing a content distribution service.

FIG. 22 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 22, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to one or more embodiments.

The mobile phone 12500 included in the content supply system 11000 according to one or more embodiments will now be described in greater detail with referring to FIGS. 23 and 24.

FIG. 23 illustrates an external structure of the mobile phone 12500 to which a video encoding method and a video decoding method are applied, according to one or more embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound outputter, and a microphone 12550 for inputting voice and sound or another type sound inputter. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 24:
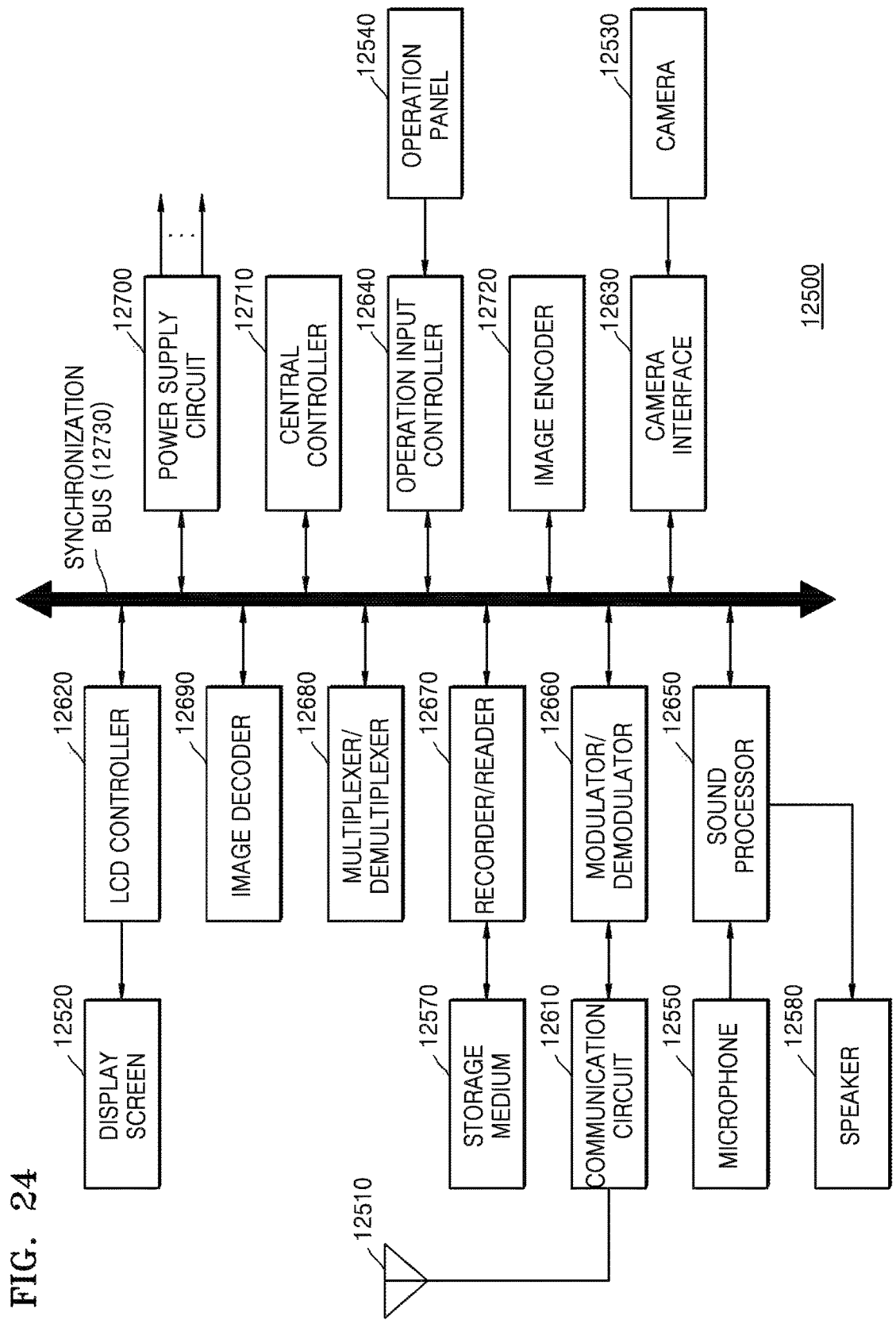

FIG. 24 illustrates an internal structure of the mobile phone 12500, according to one or more embodiments. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12710, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the above-described video encoding method according to the one or more embodiments. The image encoder 12720 may transform the image data received from the camera 12530 into compressed and encoded image data based on the above-described video encoding method according to the one or more embodiments, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoder 12690 may correspond to that of the above-described video decoding method according to the one or more embodiments. The image decoder 12690 may decode the encoded video data to obtain reconstructed video data and provide the reconstructed video data to the display screen 12520 via the LCD controller 12620, by using the above-described video decoding method according to the one or more embodiments.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to one or more embodiments, may be a transceiving terminal including only the video encoding apparatus, or may be a transceiving terminal including only the video decoding apparatus.

Figure 25:
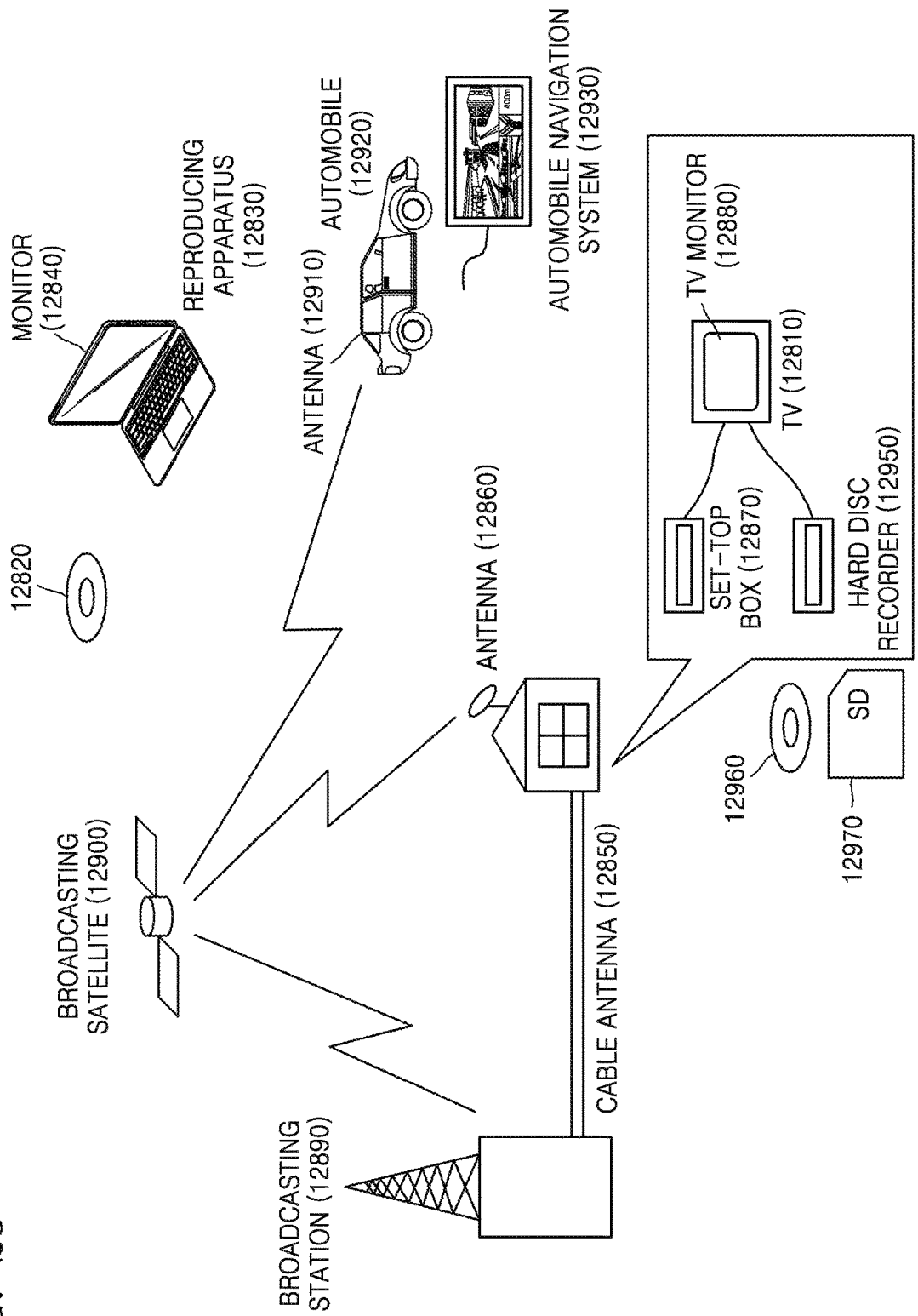
FIG. 25 is a diagram of a digital broadcast system to which a communication system is applied, according to an embodiment.

A communication system according to the one or more embodiments is not limited to the communication system described above with reference to FIG. 24. For example, FIG. 25 illustrates a digital broadcasting system employing a communication system, according to one or more embodiments. The digital broadcasting system of FIG. 25 may receive a digital broadcast transmitted via a satellite or a terrestrial network by using a video encoding apparatus and a video decoding apparatus according to one or more embodiments.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to one or more embodiments is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to one or more embodiments may be installed. Data output from the set-top box 12870 may also be reproduced on a TV monitor 12880.

As another example, a video decoding apparatus according to one or more embodiments may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by a video encoding apparatus according to one or more embodiments and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to one or more embodiments, a video signal recorded on the DVD disc 12960, the SD card 12970, or another storage medium may be reproduced on the TV monitor 12880.

Figure 26:
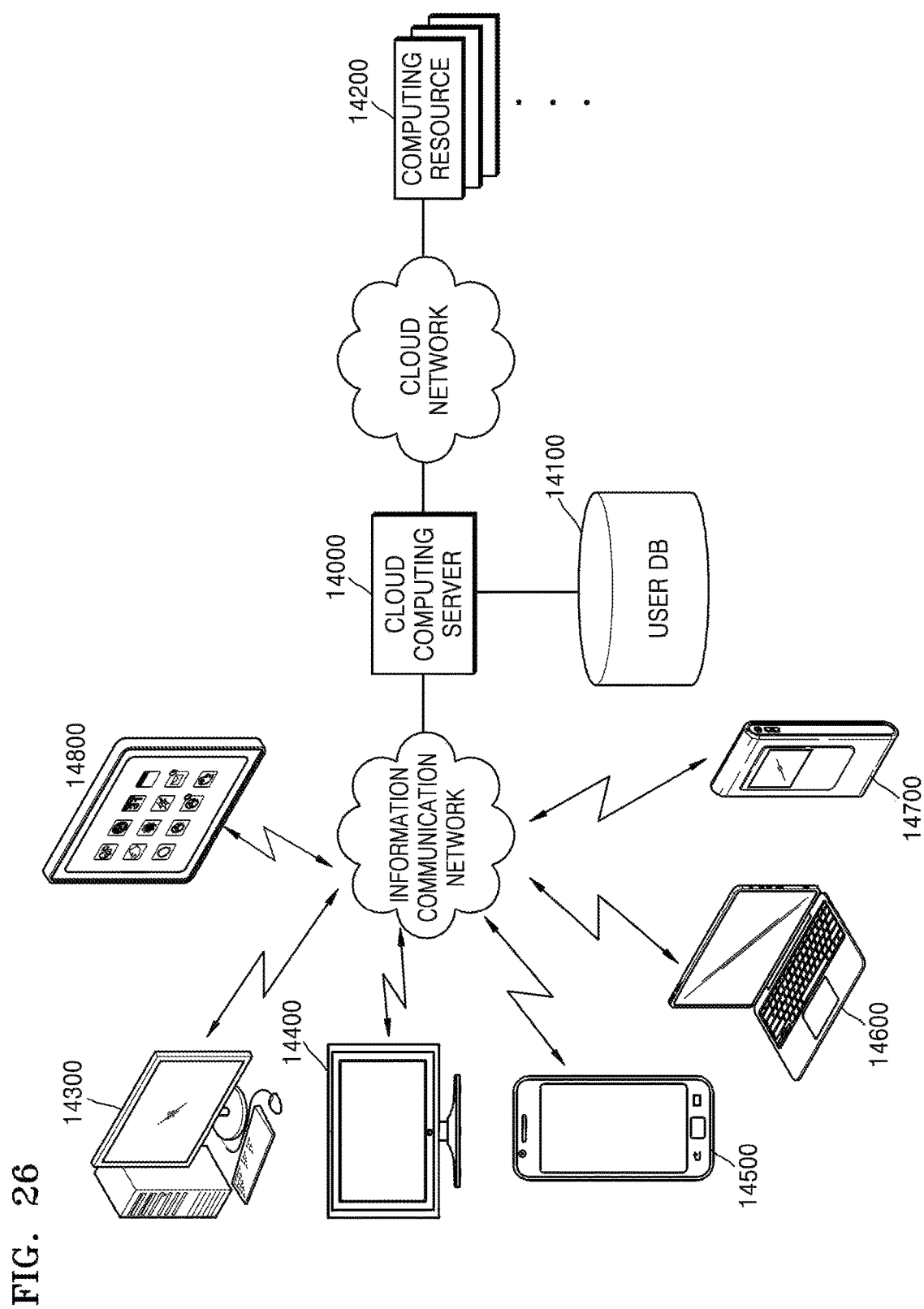
FIG. 26 is a diagram illustrating a network structure of a cloud computing system using a video encoding apparatus and a video decoding apparatus, according to an embodiment.

The automobile navigation system 12930 may not include the camera 12530 of FIG. 26, and the camera interface 12630 and the image encoder 12720 of FIG. 26. For example, the computer 12100 and the TV receiver 12810 may not include the camera 12530, the camera interface 12630, and the image encoder 12720.

FIG. 26 is a diagram illustrating a network structure of a cloud computing system using a video encoding apparatus and a video decoding apparatus, according to one or more embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1A through 19. As another example, the user terminal may include a video encoding apparatus as described above with reference to FIGS. 1A through 19. Alternatively, the user terminal may include both the video decoding apparatus and the video encoding apparatus as described above with reference to FIGS. 1A through 19.

Various applications of a video encoding method, a video decoding method, a video encoding apparatus, and a video decoding apparatus according to the one or more embodiments described above with reference to FIGS. 1A through 19 have been described above with reference to FIGS. 20 to 26. However, methods of storing the video encoding method and the video decoding method in a storage medium or methods of implementing the video encoding apparatus and the video decoding apparatus in a device, according to various embodiments, described above with reference to FIGS. 1A through 19 are not limited to the embodiments described above with reference to FIGS. 20 to 26.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An interlayer video decoding method comprising:
reconstructing a first layer image based on encoding information acquired from a first layer bitstream;
reconstructing a second layer current block by using interlayer prediction information acquired from a second layer bitstream and a first layer reference block corresponding to a current block of a first layer reconstruction image that is to be reconstructed in a second layer, wherein the second layer current block is determined based on partition mode information and prediction mode information acquired from the second layer bitstream;
acquiring, from the second layer bitstream, residual prediction information indicating whether to perform residual prediction on the second layer current block when the partition mode information indicates a 2N×2N partition mode and the prediction mode information indicates a prediction mode which is not an intra prediction mode;
when the residual prediction information indicates not to perform the residual prediction on the second layer current block,
acquiring, from the second layer bitstream, luminance compensation information indicating whether to perform luminance compensation on the second layer current block, and
compensating for luminance of the second layer current block based on the luminance compensation information and reconstructing the second layer current block of which luminance is compensated for; and
when the residual prediction information indicates to perform the residual prediction on the second layer current block,
not acquiring, from the second layer bitstream, the luminance compensation information, and
performing the residual prediction to reconstruct the second layer current block.

2. The interlayer video decoding method of claim 1, wherein the step of acquiring luminance compensation information is omitted on second layer blocks except for blocks in the 2N×2N partition mode, and luminance compensation is not performed on the second layer blocks.

3. The interlayer video decoding method of claim 1, wherein the prediction mode is a merge mode or an advanced motion vector prediction (AMVP) mode.

4. An interlayer video decoding apparatus comprising:
a first layer decoder for reconstructing a first layer image based on encoding information acquired from a first layer bitstream; and
a second layer decoder for reconstructing a second layer current block by using interlayer prediction information acquired from a second layer bitstream and using a first layer reference block corresponding to a current block of a first layer reconstruction image that is to be reconstructed in a second layer, wherein the second layer current block is determined based on partition mode information and prediction mode information acquired from the second layer bitstream,
wherein:
the second layer decoder acquires, from the second layer bitstream, residual prediction information indicating whether to perform residual prediction on the second layer current block when the partition mode information indicates a 2N×2N partition mode and the prediction mode information indicates a prediction mode which is not an intra prediction mode,
when the residual prediction information indicates not to perform the residual prediction on the second layer current block,
the second layer decoder acquires, from the second layer bitstream, luminance compensation information indicating whether to perform luminance compensation on the second layer current block, and
the second layer decoder compensates for luminance of the second layer current block based on the luminance compensation information and reconstructs the second layer current block of which luminance is compensated for, and
when the residual prediction information indicates to perform the residual prediction on the second layer current block, the second layer decoder does not acquires, from the second layer bitstream, the luminance cormpensation information, and the second layer decoder performs the residual prediction to reconstruct the second layer current block.

* * * * *